(12) United States Patent
Itoya et al.

(10) Patent No.: US 11,279,830 B2
(45) Date of Patent: *Mar. 22, 2022

(54) SURFACE-TREATED SPINEL PARTICLES, METHOD FOR PRODUCING THE SAME, RESIN COMPOSITION, AND MOLDED ARTICLE

(71) Applicant: DIC Corporation, Tokyo (JP)

(72) Inventors: Kazuo Itoya, Sakura (JP); Atsushi Oshio, Sakura (JP); Hironobu Oki, Sakura (JP); Masaki Iida, Sakura (JP); Yasuyo Sakamoto, Sakura (JP); Masamichi Hayashi, Sakura (JP); Takayuki Kanematsu, Sakura (JP); Fumihiko Maekawa, Sakura (JP); Jian-Jun Yuan, Sakura (JP); Hiroshi Kinoshita, Sakura (JP)

(73) Assignee: DIC Corporation, Tokyo (JP)

( * ) Notice: Subject to any disclaimer, the term of this patent is extended or adjusted under 35 U.S.C. 154(b) by 305 days.

This patent is subject to a terminal disclaimer.

(21) Appl. No.: 16/334,557

(22) PCT Filed: Sep. 21, 2017

(86) PCT No.: PCT/JP2017/034064
§ 371 (c)(1),
(2) Date: Mar. 19, 2019

(87) PCT Pub. No.: WO2018/056349
PCT Pub. Date: Mar. 29, 2018

(65) Prior Publication Data
US 2021/0301143 A1  Sep. 30, 2021

(30) Foreign Application Priority Data

Sep. 21, 2016 (JP) .............................. JP2016-183635
May 11, 2017 (JP) .............................. JP2017-094659

(51) Int. Cl.
| | |
|---|---|
| C09C 1/40 | (2006.01) |
| C08K 9/04 | (2006.01) |
| C08K 3/22 | (2006.01) |
| C08K 9/06 | (2006.01) |

(52) U.S. Cl.
CPC ............... *C09C 1/40* (2013.01); *C08K 3/22* (2013.01); *C08K 9/04* (2013.01); *C08K 9/06* (2013.01); *C01P 2002/32* (2013.01); *C01P 2002/60* (2013.01); *C01P 2002/72* (2013.01); *C01P 2004/03* (2013.01); *C01P 2004/61* (2013.01); *C01P 2004/62* (2013.01); *C08K 2003/2227* (2013.01); *C08K 2201/005* (2013.01)

(58) Field of Classification Search
CPC .......... C01P 2002/32; C08K 9/04; C09C 1/40
See application file for complete search history.

(56) References Cited

U.S. PATENT DOCUMENTS

| | | | |
|---|---|---|---|
| 7,879,938 B2 * | 2/2011 | Hager | D01F 1/10 524/401 |
| 10,683,212 B2 * | 6/2020 | Oki | C08K 3/08 |
| 10,793,714 B2 * | 10/2020 | Woo | C08K 3/10 |
| 11,040,887 B2 * | 6/2021 | Oki | C30B 29/60 |
| 2018/0079654 A1 | 3/2018 | Oki et al. | |

FOREIGN PATENT DOCUMENTS

| | | |
|---|---|---|
| JP | 2008-074683 A | 4/2008 |
| JP | 2012-224798 A | 11/2012 |
| JP | 2016-121049 A | 7/2016 |
| JP | 5995130 B1 | 9/2016 |
| WO | 05/033216 A1 | 4/2005 |

OTHER PUBLICATIONS

International Search Report dated Nov. 28, 2017, issued for PCT/JP2017/034064.

* cited by examiner

*Primary Examiner* — Vickey Nerangis
(74) *Attorney, Agent, or Firm* — Locke Lord LLP; James E. Armstrong, IV; Nicholas J. DiCeglie, Jr.

(57) ABSTRACT

Provided is a surface-treated spinel particle (B) including a spinel particle (A) including a magnesium atom, an aluminum atom, and an oxygen atom and a surface treatment layer disposed at least a portion of the surface of the spinel particle (A). The surface treatment layer includes a surface-treating agent including an organic compound or a cured product of the surface-treating agent. The spinel particle (A) further includes molybdenum. The crystallite diameter of the [111] plane of the spinel particle (A) is 220 nm or more. Also provided are a method for producing the surface-treated spinel particle (B), a resin composition including the surface-treated spinel particle (B), and a molded article.

10 Claims, 4 Drawing Sheets

ELECTRON BEAM IMAGE 2

Si Kα1

10 μm

ELECTRON BEAM IMAGE 2

10 μm

Si Kα1

SURFACE-TREATED SPINEL PARTICLES, METHOD FOR PRODUCING THE SAME, RESIN COMPOSITION, AND MOLDED ARTICLE

TECHNICAL FIELD

The present invention relates to a surface-treated spinel particles, a method for producing the surface-treated spinel particles, a resin composition, and a molded article.

BACKGROUND ART

Inorganic compounds have excellent properties, such as resistance to heat, water, chemicals, and light, which are far superior to organic compounds. In various technical fields, there have been attempts to use the excellent properties of inorganic compounds and impart the excellent properties to a high-molecular weight organic compound, which is not capable of producing the excellent properties alone, by dispersing an inorganic compound in the high-molecular weight organic compound.

Inorganic compounds such as metal oxides, composite oxides, and nitrides have been used for the above purpose. Specific examples of inorganic compounds include alumina (aluminum oxide), boron nitride, aluminum nitride, magnesium oxide, and magnesium carbonate. Since the above inorganic compounds are excellent in term of particular properties but poor in terms of the other properties, that is, have advantages and disadvantages, in reality, an inorganic compound appropriate for the intended use is selected and used.

Examples of the inorganic compounds include spinel, which is a mineral generally represented by the chemical composition $MgAl_2O_4$ and used as jewelry pieces. Spinel is also used for producing an electrode protective film, a fluorescence emitter, a catalyst carrier, an adsorbent, a photocatalyst, a heat-resistant insulating material, and the like, because spinel has a porous structure and is easy to modify (see, e.g., PTL 1).

When an attempt is made to disperse spinel in a high-molecular weight organic compound in order to combine spinel with the high-molecular weight organic compound as described above, in many cases, it has been difficult to disperse spinel in the high-molecular weight organic compound with stability because spinel is an inorganic compound and has an insufficient affinity for high-molecular weight organic compounds. Thus, it has been not possible to produce the excellent properties that are to be achieved when the spinel is dispersed in the high-molecular weight organic compound with stability.

CITATION LIST

Patent Literature

PTL 1: Japanese Unexamined Patent Application Publication No. 2016-121049

SUMMARY OF INVENTION

Technical Problem

An object of the present invention is to provide spinel particles having excellent dispersibility and excellent dispersion stability in high-molecular weight organic compounds and are capable of producing further excellent properties. Another object of the present invention is to provide a molded article that includes the spinel particles and a high-molecular weight organic compound and has further excellent thermal conductivity.

Solution to Problem

The inventors of the present invention conducted extensive studies and, consequently, found that surface-treated spinel particles produced by using specific untreated spinel particles and depositing a surface treatment layer including an organic compound on at least a portion of the surface of each of the spinel particles may have excellent dispersibility and excellent dispersion stability in high-molecular weight organic compounds and produce, for example, excellent thermal conductivity. Thus, the present invention was made.

Specifically, the present invention provides a surface-treated spinel particle (B) including a spinel particle (A) including a magnesium atom, an aluminum atom, and an oxygen atom and a surface treatment layer disposed at least a portion of the surface of the spinel particle (A). The surface treatment layer includes a surface-treating agent including an organic compound or a cured product of the surface-treating agent. The spinel particle (A) further includes molybdenum. The crystallite diameter of the [111] plane of the spinel particle (A) is 220 nm or more.

The present invention also provides a method for producing the surface-treated spinel particles and a resin composition and a molded article that have excellent thermal conductivity.

Advantageous Effects of Invention

The surface-treated spinel particles according to the present invention may have higher dispersibility and higher dispersion stability in high-molecular weight organic compounds and may produce more excellent properties than untreated spinel particles. Specifically, since the surface-treated spinel particles according to the present invention have high thermal conductivity, the surface-treated spinel particles may be suitably used for producing resin compositions and molded articles.

DESCRIPTION OF EMBODIMENTS

Figure 1:
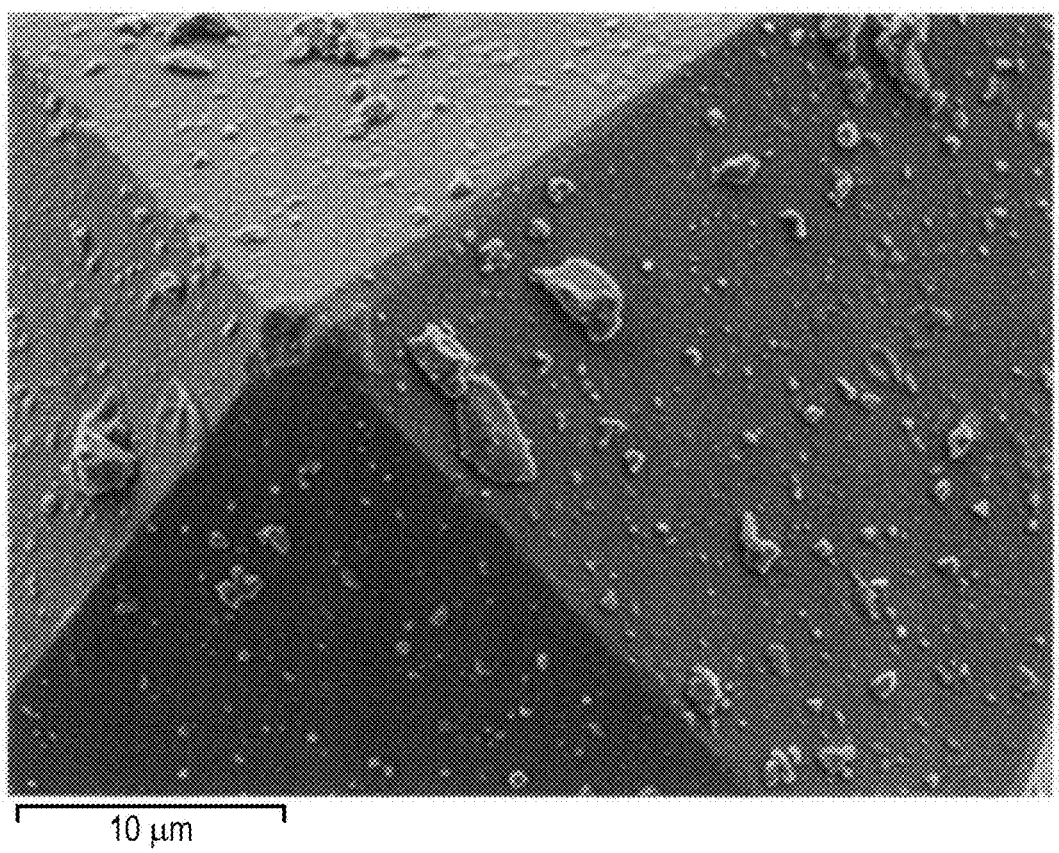
FIG. 1 is a diagram illustrating a SEM-EDS image of the surface-treated spinel particles (F-3) prepared in Example 3.

The surface-treated spinel particles according to the present invention are surface-treated spinel particles (B) that include spinel particles (A) including magnesium atoms, aluminum atoms, and oxygen atoms and a surface treatment layer disposed at least a portion of the surface of each of the spinel particles (A). The surface treatment layer includes a surface-treating agent including an organic compound or a cured product of the surface-treating agent. The spinel particles (A) further include molybdenum. The crystallite diameter of the [111] plane of the spinel particles (A) is 220 nm or more.

<Spinel Particles>

The surface-treated spinel particles (B) according to the present invention include spinel particles (A) the surfaces of which have not been treated and a surface treatment layer. The surface treatment layer is deposited on at least a portion of the surface of each of the spinel particles (A). In general, spinel is a composite oxide including magnesium atoms, aluminum atoms, and oxygen atoms which is represented by the chemical composition $MgAl_2O_4$.

Known spinel particles have various crystallite diameters and various average particle diameters and have been produced by various publicly known and commonly used production methods. It is considered that the use of a surface treatment method in which a surface-treating agent appropriate for the intended purpose is used and at least a portion of the surface of each spinel particle is coated with a cured product of the surface-treating agent enables untreated spinel particles to have excellent properties that cannot be achieved by only the untreated spinel particles. However, in reality, depending on the type of the untreated spinel particles that are subjected to the surface treatment, in many cases, the properties of the spinel particles do not become enhanced to an expected level by the surface treatment. The inventors of the present invention found that surface-treated spinel particles (B) prepared by carefully selecting spinel particles (A) having specific properties from various publicly known untreated spinel particles and treating the surfaces of the spinel particles have excellent properties that exceed the expected level.

The spinel particles (A) suitable for the preparation of the surface-treated spinel particles (B) according to the present invention are, specifically, spinel particles that include magnesium atoms, aluminum atoms, oxygen atoms, and molybdenum. Spinel particles include several crystal planes, each of which has a crystallite diameter. The findings of the inventors of the present invention revealed that the crystallite diameters of the crystal planes are the factors that determine the various properties of spinel crystals. The average diameter of spinel particles is a parameter quite different from the crystallite diameters of the crystal planes. The larger the crystallite diameter, the higher the denseness and crystalline properties of the particles. It is considered that, among spinel particles having the same parameters except the crystallite diameter, the larger the crystallite diameter, the higher the properties of spinel particles, such as resistance to heat, water, chemicals, and light, in terms of absolute value.

The inventors of the present invention also found that the crystallite diameters of specific planes of the spinel particles (A), which are raw material particles, greatly affect the degree of the property enhancement which is achieved by the surface treatment described below and that, in particular, the crystallite diameters of the specific planes have a strong correlation with thermal conductivity.

The spinel particles (A) suitable for the surface treatment in the present invention, which are carefully selected from various spinel particles, are spinel particles that include magnesium atoms, aluminum atoms, oxygen atoms, and molybdenum. The crystallite diameter of the [111] plane of the spinel particles (A) is 220 nm or more.

Since the spinel particles (A) include magnesium atoms, aluminum atoms, and oxygen atoms as described above, the spinel particles (A) are normally represented by the chemical composition $MgAl_2O_4$. The spinel particles (A) according to the present invention further include molybdenum. Examples of the form in which molybdenum is included in the spinel particles (A) include, but are not limited to, the form in which molybdenum is disposed on the surfaces of the spinel particles as a result of adhesion, coating, bonding, or an action similar to adhesion, coating, or bonding; the form in which molybdenum is incorporated in spinel; and the combination of the above forms. Examples of the "form in which molybdenum is incorporated in spinel" include the form in which at least some of the atoms constituting the spinel particles are replaced with molybdenum; and the form in which molybdenum is placed in spaces (including spaces and the like formed due to the defects of the crystal structure) that may be present inside the crystals of the spinel particles. In the form in which replacement is made, the atoms constituting the spinel particles which are to be replaced with molybdenum are not limited and may be any of magnesium atoms, aluminum atoms, oxygen atoms, and the like.

Among the above forms, it is preferable that molybdenum be included in the spinel particles such that, at least, molybdenum is incorporated in spinel. When molybdenum is incorporated in spinel, for example, the likelihood of molybdenum being removed by cleaning is reduced.

The crystallite diameter of the [111] plane of the spinel particles (A) is 220 nm or more. The [111] plane is one of the principal crystal domains of spinel particles. The size of crystal domains of the [111] plane corresponds to the crystallite diameter of the [111] plane. The larger the crystallite diameter of the [111] plane, the higher the denseness and crystalline properties of the particles and the smaller the number of irregularities at which phonon scattering occurs. That is, the larger the crystallite diameter of the [111] plane, the higher the thermal conductivity. In particular, the optimum crystallite diameter of the [111] plane of the spinel particles (A) is 260 nm or more. The crystallite diameter of the [111] plane of the spinel particles can be controlled by appropriately setting the conditions under which the production method described below is conducted. The term "crystallite diameter of the [111] plane" used herein refers to the crystallite diameter determined by the method described in Examples below.

In an embodiment of the present invention, the [311] plane of the spinel particles (A) preferably has a crystallite diameter of 100 nm or more. The [311] plane is also one of the principal crystal domains of spinel particles. The size of crystal domains of the [311] plane corresponds to the crystallite diameter of the [311] plane. The larger the crystallite diameter, the higher the denseness and crystalline properties of the particles and the smaller the number of irregularities at which phonon scattering occurs. That is, the larger the crystallite diameter, the higher the thermal conductivity. The crystallite diameter of the [311] plane of the spinel particles (A) can be controlled by appropriately setting the conditions under which the production method described below is conducted. The term "crystallite diameter of the [311] plane" used herein refers to the crystallite diameter determined by the method described in Examples.

In particular, spinel particles (A) that satisfy both of the above conditions, that is, the condition that the crystallite diameter of the [111] plane is 220 nm or more and the condition that the crystallite diameter of the [311] plane is 100 nm or more, have further high thermal conductivity.

The ratio ([111]/[311]) of the crystal peak intensity of the [111] plane of the spinel particles (A) to the crystal peak intensity of the [311] plane of the spinel particles (A) is preferably 0.30 or more, is more preferably 0.33 or more, and is further preferably 0.36 or more. In general, when the crystals of spinel particles are grown by firing, the crystal planes of the spinel crystals are likely to grow with no selectivity. However, the crystals are energetically less likely to grow on the [111] plane, and the ratio ([111] plane/[311] plane) of the crystal peak intensity of the [111] plane to the crystal peak intensity of the [311] plane is likely to be low accordingly (normally, less than 0.30). On the other hand, according to an embodiment of the present invention, it is possible to increase the peak intensity ratio of the [111] plane to the plane of the spinel particles by controlling the crystal growth. The crystallite diameter of the [111] plane of the spinel particles according to this embodiment is 220 nm or more. When the peak intensity ratio of the [111] plane to the [311] plane of the spinel particles is 0.30 or more, further high thermal conductivity may be achieved. Furthermore, the [111] plane is an automorphic plane and contributes to formation of an octahedron surrounded by the automorphic planes. Thus, when the peak intensity ratio of the [111] plane to the [311] plane of the spinel particles (A) is 0.30 or more, the likelihood of the spinel particles (A) forming a polyhedron, which is suitable for dispersing the particles in resins, is increased.

As described above, in the spinel particles (A), in which the crystallite diameter of the [111] plane is 220 nm or more and the crystallite diameter of the [311] plane is 100 nm or more, the ratio ([111]/[311]) of the crystal peak intensity of the [111] plane to the crystal peak intensity of the [311] plane is 0.30 or more. The spinel particles (A) that satisfy the above three conditions are likely to have the highest thermal conductivity and, for example, higher dispersibility in resins and the like because of the polyhedral shape thereof and, therefore, most suitably used for the preparation of resin compositions.

The peak intensity ratio ([111]/[311]) can be controlled by making an appropriate adjustment in the production method described below. The "crystal peak intensity of the [311] plane of the spinel particles and the crystal peak intensity of the [111] plane of the spinel particles" and the "ratio ([111]/[311]) of the crystal peak intensity of the [111] plane of the spinel particles to the crystal peak intensity of the [311] plane of the spinel particles" described in this description are determined by the methods described in Examples below.

The average diameter of the spinel particles (A) is not limited but is preferably, for example, 0.1 to 1000 μm. The average diameter of the spinel particles (A) is preferably 0.1 μm or more in order to prevent an excessive increase in the viscosity of a composition produced by mixing the spinel particles with a resin. The average diameter of the spinel particles (A) is preferably 1000 μm or less in order to, for example, increase the flatness and smoothness of the surface of a molded article produced by molding a composition produced by mixing the spinel particles with a resin and to enhance the mechanical properties of the molded article.

The above-described parameters, that is, the crystallite diameter of the [111] plane, the crystallite diameter of the [311] plane, and the ratio ([111]/[311]) of the crystal peak intensity of the [111] plane to the crystal peak intensity of the [311] plane, are the properties of the crystallites included in the spinel particles (A). When the spinel particles have the above-described average diameter in addition to the above properties, it becomes possible to prepare a resin composition that has an adequate viscosity, is capable of being readily formed into a desired shape, and is easy to handle. In addition, a molded article prepared using the resin composition may have excellent surface flatness and smoothness and excellent mechanical properties.

The term "particle diameter" used herein refers to the maximum distance between two points located on the outline of a particle, and the "average particle diameter" is measured and calculated by the method described in Examples below.

Examples of the shape of the spinel particles (A) include, but are not limited to, polyhedral, spherical, oval, cylindrical, polygonal columnar, acicular, rod-like, plate-like, disc-like, flake-like, and scale-like. Among the above shapes, polyhedral, spherical, oval, and plate-like are preferable in order to increase ease of dispersing the spinel particles in resins. In particular, in order to address the application in which the spinel particles are required to be charged in a resin composition at a high filling ratio, polyhedral and spherical are more preferable. The term "polyhedron" used herein generally refers to a polyhedron with 6 or more faces, preferably refers to a polyhedron with 8 or more faces, and more preferably refers to a polyhedron with 10 to 30 faces. The spinel particles may optionally include inevitable impurities, other atoms, and the like.

(Molybdenum)

Molybdenum may be included in the spinel particles due to the production method described below. The molybdenum may be included in the spinel particles in any of the following forms: the form in which molybdenum is disposed on the surfaces of the spinel particles as a result of adhesion, coating, bonding, or an action similar to adhesion, coating, or bonding; the form in which the molybdenum is incorporated in spinel; and the combination of the above forms. The molybdenum may be molybdenum atoms or molybdenum included in the molybdenum compound described below.

Although the content of molybdenum is not limited, the amount of molybdenum is preferably, as molybdenum oxide, 10% by mass or less and is more preferably 5% by mass or less of the amount of spinel particles (A) in order to enhance the thermal conductivity of the spinel particles (B) according to the present invention. The amount of molybdenum is further preferably, as molybdenum oxide, 1% by mass or less of the amount of spinel particles (A) in order to increase the denseness of the spinel particles. In this description, the content of molybdenum in the spinel particles is determined by the method described in Examples below.

<Method for Producing Spinel Particles (A)>

The method for producing the spinel particles (A) is not limited and includes 1-A) a firing step in which spinel particles (A) are formed by performing crystal growth of the spinel particles by dissolution and crystallization in the presence of molybdenum using a magnesium compound and an aluminum compound, or 1-B) a firing step in which a molybdenum compound and a magnesium compound are fired to form magnesium molybdate, and a firing step in which the magnesium molybdate and an aluminum compound are fired to form spinel particles (A); and 2) a cooling step in which the spinel particles (A) produced by crystal growth in the firing step are cooled. A method for producing the spinel particles (A) which includes the firing step 1-A) and the cooling step 2) is described below in detail.

<Method for Producing Spinel Particles>

The method for producing the spinel particles is not limited and may include a step (1) in which a first mixture (a-1) that includes a molybdenum compound and a magnesium compound or a first mixture (a-2) that includes a molybdenum compound, a magnesium compound, and an aluminum compound is fired to form an intermediate product.

[Intermediate Product Preparation Step] (First Mixture)

The first mixture includes a molybdenum compound and a magnesium compound as essential constituents. The first mixture used in the production method according to the present invention may be broadly classified into two types: a first mixture (a-1) that includes only a molybdenum compound and a magnesium compound as sources of the elements that are the raw materials for spinel; and a first mixture (a-2) that includes a molybdenum compound, a magnesium compound, and an aluminum compound as sources of the elements that are the raw materials for spinel.

Molybdenum Compound

Examples of the molybdenum compound include, but are not limited to, metal molybdenum and molybdenum compounds, such as molybdenum oxide, molybdenum sulfide, sodium molybdate, potassium molybdate, calcium molybdate, ammonium molybdate, $H_3PMo_{12}O_{40}$, and $H_3SiMo_{12}O_{40}$. Examples of the molybdenum compound include isomers thereof. For example, the molybdenum oxide may be molybdenum(IV) dioxide ($MoO_2$) or molybdenum(VI) trioxide ($MoO_3$). Among the above molybdenum compounds, molybdenum trioxide, molybdenum dioxide, and ammonium molybdate are preferable and molybdenum trioxide is more preferable.

The above molybdenum compounds may be used alone or in combination of two or more.

Magnesium Compound

Examples of the magnesium compound include, but are not limited to, metal magnesium; magnesium derivatives, such as magnesium oxide, magnesium hydroxide, magnesium peroxide, magnesium fluoride, magnesium chloride, magnesium bromide, magnesium iodide, magnesium hydride, magnesium diboride, magnesium nitride, and magnesium sulfide; magnesium oxoacid salts, such as magnesium carbonate, calcium magnesium carbonate, magnesium nitrate, magnesium sulfate, magnesium sulfite, magnesium perchlorate, trimagnesium phosphate, magnesium permanganate, and magnesium phosphate; magnesium organic salts, such as magnesium acetate, magnesium citrate, magnesium malate, magnesium glutamate, magnesium benzoate, magnesium stearate, magnesium acrylate, magnesium methacrylate, magnesium gluconate, magnesium naphthenate, magnesium salicylate, magnesium lactate, and magnesium monoperoxyphthalate; aluminum-magnesium-containing compounds, such as spinel having a low crystalline property, magnesium aluminate, hydrotalcite, and magnesium aluminum isopropoxide; and hydrates of the above magnesium compounds.

In the present invention, the aluminum-magnesium-containing compounds and the hydrates thereof are classified as magnesium compounds for the sake of simplicity.

Among the above magnesium compounds, magnesium oxide, magnesium hydroxide, magnesium carbonate, magnesium acetate, magnesium nitrate, and magnesium sulfate are preferable, and magnesium oxide, magnesium hydroxide, and magnesium acetate are more preferable.

The above magnesium compounds may be used alone or in combination of two or more. The magnesium compound may be a commercial product or a self-prepared product.

Molar Ratio of Molybdenum Element/Magnesium Element

In the intermediate product preparation step (1) included in the production method according to the present invention, the first mixture including the molybdenum compound and the magnesium compound as essential constituents, which is selected from the first mixture (a-1) including only the molybdenum compound and the magnesium compound and the first mixture (a-2) including the molybdenum compound, the magnesium compound, and an aluminum compound, is fired. Regardless of whether the mixture (a-1) or (a-2) is selected, the substance produced by firing the first mixture in the step (1) includes magnesium molybdate, which is an intermediate product, as an essential constituent.

In the production method according to the present invention, the molar ratio of the molybdenum element included in the molybdenum compound to the magnesium element included in the magnesium compound (molybdenum element/magnesium element) is 1.0 to 2.0.

The first mixture may include other compounds. Examples of the other compounds include a zinc compound, a cobalt compound, a nickel compound, an iron compound, a manganese compound, a titanium compound, a zirconium compound, a sodium compound, a calcium compound, a strontium compound, a yttrium compound, a silicon compound, and a boron compound.

Firing of First Mixture

Firing the first mixture including the magnesium compound and the molybdenum compound as essential constituents produces an intermediate product that includes magnesium molybdate.

The upper limit for the firing temperature is not set in the case where the first mixture does not include an aluminum compound, that is, the mixture (a-1) is used, because aluminum molybdate is not produced in such a case. However, the firing temperature is preferably set to 400° C. to 2000° C. and is more preferably set to 600 to 1000° C. or less in order to increase ease of performing firing. The firing temperature is preferably set to 1000° C. or less in order to avoid the fired product becoming hardened and increase ease of mixing the fired product with an aluminum compound in the subsequent step.

On the other hand, in the case where the first mixture includes an aluminum compound, that is, the mixture (a-2) is used, the firing temperature is preferably set to 400° C. to 1000° C. When the firing temperature falls within the above temperature range, the molybdenum compound reacts with the magnesium compound on a higher priority basis than with the aluminum compound to suppress the formation of aluminum molybdate. The firing temperature is further preferably set to 600° C. to 800° C. When the firing temperature falls within the above temperature range, the amount of unreacted molybdenum and the amount of the aluminum molybdate produced can be further reduced.

The firing temperature may be held at a certain temperature for a predetermined amount of time or may be gradually increased or reduced, as long as the firing temperature falls within the above temperature range.

The amount of time during which firing is performed at 400° C. to 1000° C. is preferably 4 to 100 hours inclusive of the time during which the temperature is increased, reduced, or maintained. The firing time is further preferably set to 4 to 20 hours in order to increase ease of performing the firing. It is preferable to set the firing time to be 4 hours or more in order to cause the reaction between the molybdenum compound and the magnesium compound in a suitable manner.

Subsequent to the firing in the step (1), cooling may be performed in order to isolate the magnesium molybdate. In the case where the fired product includes an aluminum compound, the step (2) described below may be conducted subsequently.

Intermediate Product

The intermediate product produced by firing the first mixture includes magnesium molybdate as an essential constituent. In the case where the first mixture is the mixture (a-1), the intermediate product substantially includes magnesium molybdate as a principal constituent. In the case where the first mixture is the mixture (a-2), the intermediate product substantially includes magnesium molybdate and aluminum molybdate as principal constituents.

Magnesium Molybdate

Magnesium molybdate serves as a source of generation of molybdenum vapor and provides magnesium atoms that form crystals with aluminum atoms included in the aluminum compound in the firing step described below.

Magnesium molybdate includes magnesium atoms, molybdenum atoms, and oxygen atoms and is commonly represented by $Mg_xMo_yO_z$. The magnesium molybdate produced in the production method according to the present invention primarily includes $MgMoO_4$, $Mg_2Mo_3O_{11}$, $MgMo_2O_7$, and solid solutions of the above magnesium molybdates with the magnesium compound or the molybdenum compound.

Aluminum Molybdate

Aluminum molybdate includes aluminum atoms, molybdenum atoms, and oxygen atoms and is commonly represented by $Al_x(MoO_4)_y$, where x and y represent an integer or decimal number of 1 or more. Aluminum molybdate may form alumina with a high α-alumina content when decomposed.

The production method according to the present invention further includes a step (2) in which a second mixture that includes the intermediate product and an aluminum compound is fired to form spinel particles. The second mixture used in the step (2) includes the intermediate product in the case where the mixture (a-2) is used in the step (1). The second mixture used in the step (2) includes the intermediate product and an aluminum compound in the case where the mixture (a-1) is used in the step (1). In the step (2), the second mixture is fired at a temperature higher than the temperature set in the step (1) to form spinel particles (A).

Spinel Firing Step

It is difficult to precisely control the crystal structure of spinel that includes a plurality of metal constituents because a defective structure and the like are likely to occur in the firing step. However, firing magnesium molybdate and an aluminum compound causes the molybdenum oxide to serve as a fluxing agent and enables the spinel crystal structure constituted by magnesium, aluminum, and oxygen to be precisely controlled.

It is possible to control the average diameter of the spinel particles (A) primarily by changing the amount of the molybdenum used, which serves as a fluxing agent, that is, specifically, by changing the above molar ratio of molybdenum element to magnesium element (molybdenum element/magnesium element). This is because the molybdenum compound serves as a flux and the crystallization of $MgAl_2O_4$ occurs upon the dissolution of the magnesium compound and/or the aluminum compound which are raw materials.

Second Mixture

The second mixture includes the intermediate product and an aluminum compound. Note that, in the case where the first mixture includes a sufficient amount of aluminum compound which is required for the spinel formation reaction, the second mixture is the same as the intermediate product except when the second mixture includes the other compounds described below.

The second mixture includes the intermediate product in the case where the mixture (a-2) is used in the step (1) above. The second mixture includes the intermediate product and an aluminum compound in the case where the mixture (a-1) is used in the step (1) above.

Aluminum Compound

Examples of the aluminum compound include, but are not limited to, metal aluminum, aluminum derivatives, such as aluminum oxide (e.g., transition alumina, such as α-alumina, γ-alumina, θ-alumina, or δ-alumina, boehmite, aluminum hydroxide, aluminum sulfide, aluminum nitride, aluminum fluoride, aluminum chloride, aluminum bromide, and aluminum iodide; aluminum oxoacid salts, such as aluminum sulfate, sodium aluminum sulfate, potassium aluminum sulfate, ammonium aluminum sulfate, aluminum nitrate, aluminum perchlorate, aluminum aluminate, aluminum silicate, and aluminum phosphate; aluminum organic salts, such as aluminum acetate, aluminum lactate, aluminum laurate, aluminum stearate, and aluminum oxalate; alkoxyaluminums, such as aluminum propoxide and aluminum butoxide; and hydrates of the above aluminum compounds. Among the above aluminum compounds, aluminum oxide, aluminum hydroxide, aluminum chloride, aluminum sulfate, aluminum nitrate, and hydrates of these aluminum compounds are preferably used, and transition alumina, such as γ-alumina, θ-alumina, or δ-alumina, boehmite, and aluminum hydroxide are more preferably used.

The above aluminum compounds may be used alone or in combination of two or more.

The molar ratio of the magnesium element included in the magnesium molybdate to the aluminum element included in the aluminum compound (aluminum element/magnesium element) is preferably 2.8 to 1.6 and is more preferably 2.2 to 1.8. It is preferable to set the above molar ratio to be 2.2 to 1.8 in order to reduce the replacement of the aluminum element with the magnesium element which occurs in the spinel crystals and enable the synthesis of spinel particles having high denseness and high thermal conductivity.

The second mixture may include a compound other than magnesium molybdate or an aluminum compound. Examples of the other compound include a zinc compound, a cobalt compound, a nickel compound, an iron compound, a manganese compound, a titanium compound, a zirconium compound, a sodium compound, a calcium compound, a strontium compound, a yttrium compound, a silicon compound, and a boron compound.

The above compound may be included in the intermediate product produced by firing the first mixture, may be included in the aluminum compound as a principal constituent or an impurity, or may be added to the second mixture when the second mixture is prepared.

Firing of Second Mixture

Firing the second mixture including the intermediate product and the aluminum compound at a temperature higher than the temperature selected in the step (1) produces spinel particles (A).

The firing temperature is not limited and may be set to any temperature at which the desired spinel particles (A) can be produced. The firing temperature is preferably set to 1000° C. to 2000° C., is more preferably set to 1200° C. to 1600° C., and is most preferably set to 1300° C. to 1500° C. in order to produce spinel particles (A) having a high crystalline property in a short time and increase ease of controlling the diameter of spinel particles.

The amount of time during which firing is performed is not limited. The firing time is preferably set to 0.1 to 1000 hours and is more preferably set to 3 to 100 hours in order to produce spinel particles (A) having a high crystalline property, increase the productivity, and save energy consumption.

The atmosphere in which firing is performed may be an air atmosphere, an inert gas atmosphere containing a nitrogen gas, an argon gas, or the like, an oxygen atmosphere, an ammonia gas atmosphere, or a carbon dioxide atmosphere. The firing atmosphere is preferably an air atmosphere from the viewpoint of production costs. In the case where the surface modification or the like of the spinel particles (A) is performed simultaneously with firing, the firing atmosphere is preferably an ammonia gas atmosphere.

The pressure at which firing is performed is not limited and may be normal pressure, an increased pressure, or a reduced pressure. It is preferable to perform firing at normal pressure from the viewpoint of production costs.

The unit used for performing heating is not limited but is preferably a firing furnace. Examples of the firing furnace that may be used for the firing include a tunnel furnace, a roller hearth furnace, a rotary kiln, and a muffle furnace.

[Firing Step by Dissolution and Crystallization]

According to an embodiment of the present invention, the spinel particles (A) can be produced by firing a third mixture of the magnesium compound and the aluminum compound in the presence of molybdenum atoms and thereby performing dissolution and crystallization.

Firing the third mixture including the aluminum source and the molybdenum compound produces aluminum molybdate, which is an intermediate compound. When the aluminum molybdate becomes decomposed, the molybdenum compound is vaporized and an aluminum compound that includes molybdenum is formed. The vaporization of the molybdenum compound serves as a driving force for the crystal growth of the aluminum compound that includes molybdenum.

The dissolution and crystallization are commonly performed by a "solid-phase method". Specifically, the magnesium compound and the aluminum compound react with each other at the interfaces to create nuclei, and magnesium atoms and/or aluminum atoms undergo solid-phase diffusion with the nuclei to react with the aluminum compound and/or the magnesium compound, respectively. This enables the production of dense crystals, that is, the spinel particles. In the solid-phase diffusion, the rate at which the magnesium atoms diffuse into the aluminum compound is higher than the rate at which the aluminum atoms diffuse into a metal compound. Therefore, the resulting spinel particles are likely to be reflective of the shape of particles of the aluminum compound. Thus, it is possible to control the shape and the average diameter of the spinel particles (A) by appropriately changing the shape and the average diameter of particles of the aluminum compound.

The above solid-phase reaction is conducted in the presence of molybdenum. Although it is difficult to precisely control the crystal structure of spinel particles that include a plurality of metal constituents because a defective structure and the like are likely to occur in the firing step, the use of molybdenum enables the control of the crystal structure of spinel. This enables an increase in the crystallite diameter of the [111] plane and the production of spinel composite oxide particles having excellent thermal conductivity. Since the solid-phase reaction is conducted in the presence of molybdenum, the resulting spinel particles (A) may include molybdenum.

The aluminum compound preferably includes molybdenum. Examples of the form in which molybdenum is included in the aluminum compound including molybdenum include, but are not limited to, the following, as in the spinel particles: the form in which molybdenum is disposed on the surfaces of the particles of the aluminum compound as a result of adhesion, coating, bonding, or an action similar to adhesion, coating, or bonding; the form in which molybdenum is incorporated in the aluminum compound; and the combination of the above forms. Examples of the "form in which molybdenum is incorporated in the aluminum compound" include the form in which at least some of the atoms constituting the aluminum compound are replaced with molybdenum; and the form in which molybdenum is placed in spaces (including spaces and the like formed due to the defects of the crystal structure) that may be present inside the crystals of the aluminum compound. In the form in which replacement is made, the atoms constituting the aluminum compound which are to be replaced with molybdenum are not limited and may be any of aluminum atoms, oxygen atoms, and the like.

Among the above aluminum compounds, an aluminum compound that includes molybdenum is preferably used, and an aluminum compound that includes molybdenum incorporated therein is more preferably used.

The aluminum compound that includes molybdenum can be prepared by the flux method described above.

[Cooling Step]

The cooling step is a step in which the spinel particles (A) formed by crystal growth in the firing step are cooled. The cooling rate is not limited but is preferably 1 to 1000° C./hour. It is preferable to set the cooling rate to be 1° C./hour or more in order to reduce the production time. It is preferable to set the cooling rate to be 1000° C./hour or less in order to reduce the likelihood of the container used for firing being cracked from heat shock and thereby increase the service life of the container. The cooling method is not limited; natural air cooling may be performed or a cooling apparatus may be used.

Details of the method for producing the spinel particles (A) which includes the firing step 1-A) and the cooling step 2) are described above. The firing step 1-A) may be replaced with the firing step 1-B) in which the molybdenum compound, the magnesium compound, and the aluminum compound are fired to form the spinel particles (A).

The method for producing the spinel particles (A) which includes the firing step 1-B) has another advantage that the molybdenum compound serves as a fluxing agent with further effect and the crystal growth of the spinel particles (A) can be precisely controlled, which enables the production of spinel particles (A) having a large crystallite diameter. It is possible to produce spinel particles (A) having higher thermal conductivity by the production method including 1-B) than by the production method including 1-A).

The surface-treated spinel particles (B) according to the present invention can be produced by, for example, depositing a surface treatment layer on at least a portion of the surface of each of the spinel particles (A) prepared in the above-described manner. Specifically, the surface treatment layer can be formed by mixing the spinel particles (A) with a surface-treating agent that includes an organic compound and depositing the surface-treating agent on at least a portion of the surface of each of the spinel particles (A). The surface treatment layer may be formed by only depositing the surface-treating agent on the spinel particles (A) or by performing drying and/or curing subsequent to the deposition of the surface-treating agent. In the case where the surface-treating agent includes an organic compound that is not reactive but has adsorptivity or the surface-treating agent is a solution or dispersion liquid prepared by dissolving or dispersing a surface-treating agent in a liquid medium, drying may be performed in order to facilitate adsorption or remove the liquid medium. In the case where the surface-treating agent includes a reactive organic compound, curing may be performed in accordance with the reactive group included in the compound in order to form the surface treatment layer. In the case where the surface-treating agent is deposited on the entire surfaces of the spinel particles (A), the spinel particles (A) are covered with the surface treatment layer.

Depositing the surface treatment layer on at least a portion of the surface of each of the spinel particles (A) enhances wettability to a high-molecular weight organic compound (C) included in a resin composition and increases the adhesion between the high-molecular weight organic compound (C) and the surface-treated spinel particles (B). This reduces the formation of gaps (voids) which are likely to be formed in the surfaces of the spinel particles and limits the loss in thermal conductivity. As a result, for example, the thermal conductivity of a molded article prepared using the resin composition may be improved. The above-described technical advantages are achieved when a surface treatment layer constituted by a surface-treating agent that includes an organic compound or by a cured product of the surface-treating agent is deposited on at least a portion of the surface of each of the spinel particles (A). The technical advantages cannot be achieved when the surface treatment layer is removed from the surface-treated spinel particles (B) by, for example, performing firing subsequent to the surface treatment.

<Surface-Treating Agent>

The surface-treating agent used in the present invention includes an organic compound. The organic compound includes a site capable of being adsorbed to or reactive with the spinel particles (A) that are inorganic compound particles. Specific examples of the organic compound include an organosilane compound, an organotitanium compound, and an organic phosphate compound. Examples of these organic compounds include the following.

The organosilane compound is preferably a silane coupling agent. Examples of the silane coupling agent include, but are not limited to, vinyltrichlorosilane, vinyltriethoxysilane, vinyltrimethoxysilane, γ-methacryloxypropyltrimethoxysilane, β(3,4-epoxycyclohexyl)ethyltrimethoxysilane, γ-glycidoxypropyltrimethoxysilane, hexyltrimethoxysilane, decyltrimethoxysilane, octadecyltrimethoxysilane, γ-glycylmethoxypropylmethyldiethoxysilane, N-β(aminoethyl)γ-aminopropyltrimethoxysilane, N-β(aminoethyl)γ-aminopropylmethyldimethoxysilane, γ-aminopropyltriethoxysilane, N-phenyl-γ-aminopropyltrimethoxysilane, γ-mercaptopropyltrimethoxysilane, and γ-chloropropyltrimethoxysilane.

Examples of the organotitanium compound include a titanium coupling agent. Specific examples of the titanium coupling agent include diisopropoxy titanium bis(triethanolaminate), dihydroxy titanium bislactate, dihydroxy bis(ammonium lactate)titanium, bis(dioctylpyrophosphate)ethylene titanate, bis(dioctylpyrophosphate)oxyacetate titanate, tri-n-butoxytitanium monostearate, tetra-n-butyl titanate, tetra(2-ethylhexyl) titanate, tetraisopropyl bis(dioctylphosphate) titanate, tetraoctyl bis(ditridecylphosphate) titanate, tetra(2,2-diallyloxymethyl-1-butyl) bis(ditridecyl)phosphate titanate, isopropyl trioctanoyl titanate, isopropyl tricumylphenyl titanate, isopropyl triisostearoyl titanate, isopropyl isostearoyl diacryl titanate, isopropyl dimethacryl isostearoyl titanate, isopropyl tri(dioctylphosphate) titanate, isopropyl tridodecylbenzene sulfonyl titanate, isopropyl tris(dioctylpyrophosphate) titanate, and isopropyl tri(N-amideethyl•aminoethyl) titanate. Among the above titanium coupling agents, isopropyl tri(N-amideethyl•aminoethyl) titanate is preferable.

Examples of commercial titanium coupling agents include PLENACT (registered trademark) produced by Ajinomoto Fine-Techno Co., Inc.

Examples of the organic phosphate compound include a phosphate ester, an alkyl phosphonic acid, and an aralkyl phosphonic acid. Examples of the phosphate ester include publicly known phosphate esters, such as an orthophosphoric acid monoester or diester of oleyl alcohol, stearyl alcohol, or the like and a mixture thereof.

Examples of the alkyl phosphonic acid include phosphonic acids including an alkyl group having 1 to 20 carbon atoms. Specific examples of the alkyl group having 1 to 20 carbon atoms which is not substituted include methyl, ethyl, n-propyl, isopropyl, n-butyl, isobutyl, sec-butyl, tert-butyl, n-pentyl, isopentyl, neopentyl, tert-amyl, 1,2-dimethylpropyl, n-hexyl, cyclohexyl, 1,3-dimethylbutyl, 1-isopropylpropyl, 1,2-dimethylbutyl, n-heptyl, 2-heptyl, 1,4-dimethylpentyl, tert-heptyl, 2-methyl-1-isopropylpropyl, 1-ethyl-3-methylbutyl, n-octyl, tert-octyl, 2-ethylhexyl, 2-methylhexyl, 2-propylhexyl, n-nonyl, isononyl, n-decyl, isodecyl, n-undecyl, isoundecyl, n-dodecyl, isododecyl, n-tridecyl, isotridecyl, n-tetradecyl, isotetradecyl, n-pentadecyl, isopentadecyl, n-hexadecyl, isohexadecyl, n-heptadecyl, isoheptadecyl, n-octadecyl, isooctadecyl, n-nonadecyl, isononadecyl, n-icosyl, isoicosyl, cyclopentyl, cyclohexyl, cyclooctyl, cyclododecyl, and 4-methylcyclohexyl. The substituent group included in the above alkyl group is preferably an inactive group. Preferable examples of the substituent group include an alkoxy group, a halogen atom, a formyl group, an acyl group, a carboxyl group, a cyano group, a nitro group, and a sulfone group.

Examples of the aralkyl phosphonic acid include phosphonic acids including an aralkyl group (i.e., an alkyl group substituted with an aryl group) having 7 to 20 carbon atoms. Examples of the aralkyl group having 7 to 20 carbon atoms which is not substituted include benzyl, phenethyl, 2-phenylpropan-2-yl, styryl, cinnamyl, diphenylmethyl, and triphenylmethyl.

Publicly known and commonly used treatment methods may be used for the application of the surface-treating agent. For example, dry processes, such as a method in which the surface-treating agent is sprayed with a fluid nozzle, a method in which stirring is performed while a shearing force is applied, and a method in which a ball mill, a mixer, or the like is used; and wet processes, such as a method in which an aqueous solvent, an organic solvent, or the like is used, may be employed. When a shearing force is used in the surface treatment, it is desirable to perform the surface treatment such that the filler does not become fractured.

The surface treatment is preferably performed by a wet process in order to increase the amount of the surface-treating agent deposited and the uniformity of coating.

The temperature inside the system in which the dry process is performed using the surface-treating agent and the temperature at which drying or curing is performed subsequent to the treatment performed by the wet process is adequately set in accordance with the type of the surface-treating agent used such that pyrolysis does not occur; it is desirable to perform heating at, for example, 80° C. to 230° C.

The surface treatment using the surface-treating agent is preferably performed by chemical vapor deposition (i.e., CVD method), which reduces aggregation of particles and increases the uniformity in the thickness of the surface treatment layer deposited on each of the spinel particles over the entire perimeter of the particle and the uniformity in the amount of the surface treatment layer deposited on the particle per unit surface area.

It is known that, in the CVD method, a chemical reaction is induced by thermal energy, plasma energy, solar energy, or the like. Among these, a thermal CVD method, in which thermal energy is used, is preferable because it does not require a special and expensive facility capable of creating and maintaining a high-vacuum state, unlike an ordinary CVD method, and enables the surface treatment layer to be formed using a relatively inexpensive facility with high productivity as a result of the surface-treating agent being deposited on the fine irregular structure formed in the surfaces of the spinel particles with high followability and high efficiency. Furthermore, a thermal CVD method enables the control of the thickness of the surface treatment layer and, in the case where the surface-treating agent includes a reactive organic compound, the control of the curing that occurs due to the reactive group included in the compound.

The thermal CVD method is a method in which a raw material that is a gas or liquid is heated to vaporize and a thin-film is formed by a chemical reaction caused in the vapor gas phase or on the surface of the spinel particles.

Since this treatment is performed in a gas phase, aggregation of particles is reduced compared with a treatment performed in a liquid or solid phase. This increases ease of producing the surface-treated spinel particles that include a surface treatment layer deposited thereon with a uniform thickness in a uniform amount. A CVD method reduces aggregation of particles compared with a treatment performed in a liquid phase and increases ease of increasing the uniformity in the thickness of the surface treatment layer deposited on each of the spinel particles over the entire perimeter of the particle and the uniformity in the amount of the surface treatment layer deposited on the particle per unit surface area.

In the surface treatment of the spinel particles (A) performed by a thermal CVD method, for example, the surface-treating agent and the spinel particles (A) are charged into a hermetically sealed high-pressure reaction container so as not to come into direct contact with each other, and the entire reaction container is heated to produce the surface-treated spinel particles (B). For performing heating, an electric furnace, a combustion furnace, heat exchange, and infrared heating may be used.

It is preferable to set the temperature inside the heated reaction container to be lower than the boiling point of the surface-treating agent. The specific temperature may be appropriately selected in accordance with the type of the surface-treating agent used. For example, in the case where the surface-treating agent used includes an organosilane compound, an organotitanium compound, or an organic phosphate compound and a thermal CVD method is used for performing the surface treatment of the spinel particles (A), the temperature is preferably set to about 50° C. to 400° C. It is more preferable to set the treatment temperature to about 100° C. to 300° C. in order to increase the uniformity of the surface treatment layer.

Whether the surface treatment layer composed of the surface-treating agent is uniformly deposited on the surfaces of the surface-treated spinel particles (B) can be determined by the SEM-EDS analysis of the surface-treated spinel particles (B). Since spinel has an octahedral crystal structure with flat automorphic planes, the uniformity of the surface treatment layer deposited on the flat automorphic planes can be readily determined by, for example, taking a SEM-EDS image that covers as many automorphic planes as possible or a SEM-EDS image of each of the automorphic planes and processing the SEM-EDS images. Specifically, in the case where the surface-treating agent used includes an organosilane compound, whether the surface treatment layer is uniformly deposited on the surfaces of the surface-treated spinel particles (B) can be determined by measuring the distribution of silicon atoms derived from the organosilane compound (because, in general, when image processing is performed subsequent to the measurement, the atoms appear as dots and the density of the dots indicates the degree of nonuniformity in the distribution of the atoms).

The amount of the surface treatment layer deposited on the surfaces of the surface-treated spinel particles (B) is 0.0001 to 0.1 g per square meter. The amount of the surface treatment layer deposited on the surfaces of the surface-treated spinel particles (B) is more preferably 0.001 to 0.05 g and is particularly preferably 0.005 to 0.03 g per square meter in order to enhance both thermal conductivity and adhesion.

The amount of the surface treatment layer deposited on the surfaces of the surface-treated spinel particles (B) per square meter is the value (a/b) obtained by dividing a reduction (a) in the weight of the surface-treated spinel particles (B) relative to 1 g of the surface-treated spinel particles (B) which is determined from a reduction in the mass of the surface-treated spinel particles (B) during heating from 200° C. to 500° C. which is measured when the surface-treated spinel particles (B) are heated from room temperature: 25° C. to 500° C. in an air atmosphere at 10° C./minute with a thermogravimetric analyzer (TGA), by the surface area (b) of the surface-treated spinel particles (B) per gram which is measured using BET specific surface area.

Whether unknown spinel particles are equivalent to the surface-treated spinel particles (B) according to the present invention can be determined by, for example, determining whether the presence of the indices, that is, a chemical structure, a silicon atom, a titanium atom, and a phosphorus atom that corresponds to the surface-treating agent or a cured product of the surface-treating agent, are confirmed in an extract prepared by, for example, immersing the unknown spinel particles in a solvent in which the nonvolatile content or cured product of the surface-treating agent is soluble or boiling the unknown spinel particles or on the surfaces of the spinel particles by infrared absorption spectrometry (IR) or atomic absorption spectrometry (AA).

The surface-treated spinel particles (B) according to the present invention may be a single type of the surface-treated spinel particles (B) having a specific average diameter or a combination of two or more types of the surface-treated spinel particles (B) having different specific average diameters and different particle-size distributions. For example, it is preferable to maximize the amount of the surface-treated spinel particles (B) added to a high-molecular weight organic compound (C) in order to produce a resin composition used in an application that requires higher thermal conductivity. Using three types of the surface-treated spinel particles (B) having different specific average diameters and different particle-size distributions, that is, large, medium, and small surface-treated spinel particles, in combination enables gaps formed between the large particles to be filled with the middle and small particles and makes it possible to readily form a packed structure. As a result, it becomes possible to further increase the amount of the surface-treated spinel particles (B) added to the high-molecular weight organic compound (C), which increases the number of thermal conduction paths and enables further excellent thermal conductivity to be achieved.

Specific examples of the three types of surface-treated spinel particles (B) having different specific average diameter and different particle-size distributions include a combination of the following three types of spinel particles (B): spherical or polyhedral spinel particles (B1) having a 50%-cumulative particle diameter of 10 to 100 µm; spherical or polyhedral spinel particles (B2) having a 50%-cumulative particle diameter of 1 to 30 µm, the 50%-cumulative particle diameter of the spinel particles (B2) being 1/10 or more and ½ or less of that of the spinel particles (B1); and spherical or polyhedral spinel particles (B3) having a 50%-cumulative particle diameter of 5 µm or less, the 50%-cumulative particle diameter of the spinel particles (B3) being 1/100 or more and ½ or less of that of the spinel particles (B2).

The amount of the surface-treated spinel particles (B) included in the resin composition according to the present invention is, for example, 15% to 95% by mass of the amount of the solid component that includes the high-molecular weight organic compound (C) and the surface-treated spinel particles (B). When the content of the surface-treated spinel particles (B) is 15% by mass or more, a molded article having excellent thermal conductivity may be produced. When the content of the surface-treated spinel particles (B) is 95% by mass or less, sufficiently high adhesion and sufficiently high flowability may be achieved. The content of the surface-treated spinel particles (B) is more preferably 20% to 95% by mass and is particularly preferably 30% to 94% by mass in order to enhance all of thermal conductivity, adhesion, and flowability.

<Composition>

According to an embodiment of the present invention, a resin composition that includes the surface-treated spinel particles (B) and a high-molecular weight organic compound (C) is provided. The composition may optionally further include a curing agent, a curing catalyst, a viscosity modifier, a plasticizer, and the like.

The spinel particles may be the above-described surface-treated spinel particles (B). The amount of the spinel particles is preferably 10% to 95% by mass and is more preferably 30% to 90% by mass of the amount of the composition. It is preferable to set the content of the spinel particles to be 10% by mass or more in order to use the high thermal conductivity of the spinel particles efficiently. It is preferable to set the content of the spinel particles to be 95% by mass or less in order to produce a resin composition having excellent formability.

<Other Inorganic Fillers>

In the preparation of the resin composition according to the present invention, untreated spinel particles and inorganic filler particles the surfaces of which have been treated or have not been treated may be used in addition to the surface-treated spinel particles (B) such that the advantageous effects of the present invention are not impaired. Publicly known and commonly used inorganic fillers may be used. Examples thereof include electrically conductive powders, such as powders of gold, platinum, silver, copper, nickel, palladium, iron, aluminum, stainless steel, and graphite; and electrically non-conductive powders, such as powders of silicon oxide, silicon nitride, aluminum nitride, boron nitride, aluminum borate, aluminum oxide, magnesium oxide, magnesium carbonate, and diamond. The above inorganic fillers may be used alone or in a mixture of two or more.

Among the above inorganic fillers, aluminum oxide particles the surfaces of which have been treated, aluminum oxide particles the surfaces of which have not been treated, and spinel particles the surfaces of which have not been treated are preferable because using these inorganic fillers in combination with the surface-treated spinel particles (B) enables further excellent thermal conductivity and further excellent insulating property to be both achieved. Regardless of whether the surface treatment has been performed, three types of particles having large, medium, and small diameters may be prepared as for the spinel particles and large spinel particles and large aluminum oxide particles may be used in combination. In another case, large spinel particles may be used in combination with medium and small aluminum oxide particles.

(High-Molecular Weight Organic Compound)

Examples of the high-molecular weight organic compound (C) include, but are not limited to, a thermoplastic resin and a thermosetting resin.

The thermoplastic resin is not limited; resins publicly known and commonly used as a molding material and the like may be used. Specific examples of such thermoplastic resins include a polyethylene resin, a polypropylene resin, a polymethyl methacrylate resin, a polyvinyl acetate resin, an ethylene-propylene copolymer, an ethylene-vinyl acetate copolymer, a polyvinyl chloride resin, a polystyrene resin, a polyacrylonitrile resin, a polyamide resin, a polycarbonate resin, a polyacetal resin, a polyethylene terephthalate resin, a polyphenylene oxide resin, a polyphenylene sulfide resin, a polysulfone resin, a polyether sulfone resin, a polyether ether ketone resin, a polyarylsulfone resin, a thermoplastic polyimide resin, a thermoplastic urethane resin, a polyamino bismaleimide resin, a polyamide imide resin, a polyether imide resin, a bismaleimide triazine resin, a polymethylpentene resin, a fluororesin, a liquid crystal polymer, an olefin-vinyl alcohol copolymer, an ionomer resin, a polyarylate resin, an acrylonitrile-ethylene-styrene copolymer, an acrylonitrile-butadiene-styrene copolymer, and an acrylonitrile-styrene copolymer.

The thermosetting resin is a resin having the property of becoming substantially insoluble and infusible upon being cured by heating or means using radiation, a catalyst, or the like. In general, resins publicly known and commonly used as a molding material and the like may be used. Specific examples of such thermosetting resins include novolac phenolic resins, such as a phenol novolac resin and a cresol novolac resin; phenolic resins, such as resole phenolic resins, such as an unmodified resole phenolic resin and an oil-modified resole phenolic resin modified with a tung oil, a linseed oil, a walnut oil, or the like; bisphenol epoxy resins, such as a bisphenol A epoxy resin and a bisphenol F epoxy resin; novolac epoxy resins, such as an aliphatic chain-modified bisphenol epoxy resin, a novolac epoxy resin, and a cresol novolac epoxy resin; epoxy resins, such as a biphenyl epoxy resin and a polyalkylene glycol epoxy resin; resins including a triazine ring, such as a urea resin and a melamine resin; vinyl resins, such as a (meth)acrylic resin and a vinyl ester resin; and an unsaturated polyester resin, a bismaleimide resin, a polyurethane resin, a diallyl phthalate resin, a silicone resin, a resin including a benzoxazine ring, and a cyanate ester resin.

The above resins may be used alone or in combination of two or more. Specifically, two or more thermoplastic resins may be used in combination, two or more thermosetting resins may be used in combination, and one or more thermoplastic resins and one or more thermosetting resins may be used in combination.

The amount of the high-molecular weight organic compound (C) is preferably 5% to 90% by mass and is more preferably 10% to 70% by mass of the amount of the composition. It is preferable to set the content of the high-molecular weight organic compound (C) to be 5% by mass or more in order to impart excellent formability to the resin composition. It is preferable to set the content of the resin to be 90% by mass or less in order to produce a compound having high thermal conductivity by molding.

(Curing Agent)

The curing agent is not limited; publicly known curing agents may be used. Specific examples of the curing agent include an amine compound, an amide compound, an acid anhydride compound, and a phenolic compound.

Examples of the amine compound include diaminodiphenylmethane, diethylenetriamine, triethylenetetramine, diaminodiphenylsulfone, isophoronediamine, imidazole, a BF3-amine complex, and a guanidine derivative.

Examples of the amide compound include dicyandiamide and a polyamide resin synthesized from a linolenic acid dimer and ethylenediamine.

Examples of the acid anhydride compound include phthalic anhydride, trimellitic anhydride, pyromellitic anhydride, maleic anhydride, tetrahydrophthalic anhydride, methyltetrahydrophthalic anhydride, methylnadic anhydride, hexahydrophthalic anhydride, and methylhexahydrophthalic anhydride.

Examples of the phenolic compound include the following polyhydric phenolic compounds: a phenol novolac resin, a cresol novolac resin, an aromatic hydrocarbon formaldehyde resin-modified phenolic resin, a dicyclopentadiene phenol addition-type resin, a phenol aralkyl resin (i.e., a Xylok resin), a polyhydric phenol novolac resin synthesized from a polyhydric hydroxy compound and a formaldehyde, such as a resorcine novolac resin, a naphthol aralkyl resin, a trimethylolmethane resin, a tetraphenylolethane resin, a naphthol novolac resin, a naphthol-phenol co-condensed novolac resin, a naphthol-cresol co-condensed novolac resin, a biphenyl-modified phenolic resin (i.e., a polyhydric phenolic compound that includes phenol nuclei connected to one another with a bismethylene group), a biphenyl-modified naphthol resin (i.e., a polyhydric naphthol compound that includes phenol nuclei connected to one another with a bismethylene group), an aminotriazine-modified phenolic resin (i.e., a polyhydric phenolic compound that includes phenol nuclei connected to one another with melamine, benzoguanamine, and the like), and an alkoxy group-containing aromatic ring-modified novolac resin (i.e., a polyhydric phenolic compound that includes a phenol nucleus and an alkoxy group-containing aromatic ring connected to each other with formaldehyde). The above curing agents may be used alone or in combination of two or more.

(Curing Accelerator)

A curing accelerator increases the curing rate of the composition when the composition is cured. Examples of the curing accelerator include, but are not limited to, a phosphorus compound, tertiary amine, imidazole, a metal salt of an organic acid, a Lewis acid, and an amine complex salt. The above curing accelerators may be used alone or in combination of two or more.

(Curing Catalyst)

The curing catalyst induces, instead of the curing agent, the curing reaction of a compound including an epoxy group. The curing catalyst is not limited; publicly known and commonly used thermal polymerization initiators and active energy ray polymerization initiators may be used. The above curing catalysts may be used alone or in combination of two or more.

(Solvent)

The resin composition according to the present invention may include a solvent depending on the intended use. Examples of the solvent include organic solvents, such as methyl ethyl ketone, acetone, ethyl acetate, toluene, dimethylformamide, methyl isobutyl ketone, methoxypropanol, cyclohexanone, methyl cellosolve, ethyl diglycol acetate, and propylene glycol monomethyl ether acetate. The type and adequate amount of the solvent used may be selected appropriately in accordance with the intended use.

(Viscosity Modifier)

The viscosity modifier is used for adjusting the viscosity of the composition. The viscosity modifier is not limited and may be an organic polymer, polymer particles, inorganic particles, or the like. The above viscosity modifiers may be used alone or in combination of two or more.

(Plasticizer)

The plasticizer enhances the formability, flexibility, and weather resistance of a thermoplastic synthetic resin. The plasticizer is not limited and may be a phthalate ester, an adipate ester, a phosphate ester, a trimellitate ester, a polyester, a polyolefin, or a polysiloxane. The above plasticizers may be used alone or in combination of two or more.

(Applications)

According to an embodiment of the present invention, the composition according to this embodiment may be used as a thermally conductive material.

Alumina has been used as a thermally conductive material from the viewpoint of costs. Other examples of the thermally conductive materials that have been used in the related art include boron nitride, aluminum nitride, magnesium oxide, and magnesium carbonate. In contrast, since spinel particles are known to have lower thermal conductivity than alumina, there has been no attempt to use spinel particles instead of alumina.

In this regard, the untreated spinel particles according to this embodiment have excellent thermal conductivity since the crystallite diameter of the [111] plane of the spinel particles is large. Specifically, the spinel particles have higher thermal conductivity than alumina. The surface-treated spinel particles (B) produced using the untreated spinel particles have markedly high properties. Consequently, the composition according to this embodiment is suitably used as, for example, a thermally conductive material.

According to an embodiment, the surface-treated spinel particles (B) produced by the above-described production method have a particle diameter of the order of micrometers (i.e., 1000 μm or less) and, when the crystallite diameter is large, excellent dispersibility in a resin, that is, the high-molecular weight organic compound (C). In such a case, the surface-treated spinel particles (B) produce further excellent thermal conductivity when added to the composition.

According to another embodiment, since the spinel particles produced by the above-described production method are automorphic polyhedral particles and are not particles produced by pulverizing particles having no regular shape, the spinel particles have excellent flatness and smoothness and excellent dispersibility in resins. Thus, the spinel particles produce considerably high thermal conductivity when added to the composition.

The surface-treated spinel particles (B) can also be used for producing, for example, a catalyst carrier, an adsorbent, a photocatalyst, an optical material, a heat-resistant insulating material, a substrate, and a sensor.

<Molded Article>

According to an embodiment of the present invention, a molded article produced by molding the above composition is provided. Since the surface-treated spinel particles (B) included in the molded article have excellent thermal conductivity, the molded article is preferably used as an insulative heat-dissipation member. This enhances the heat-dissipation property of a device and enables reductions in the size and weight of the device and improvement of the performance of the device.

According to another embodiment of the present invention, the molded article may also be used as, for example, a low-dielectric member. Since the spinel particles have a low dielectric constant, the spinel particles may contribute to enhancement of communication function when used for producing a high-frequency circuit.

EXAMPLES

The present invention is described further in detail with reference to Examples below. The present invention is not limited by the following description. All the quantities described in Examples are on a mass basis unless otherwise specified.

Synthesis Example 1

Synthesis of Spinel Particles (A-1)

Into an alumina crucible, 7.7 parts by mass (magnesium element: 0.19 mol) of magnesium oxide (high-purity magnesium oxide HP-30A produced by Konoshima Chemical Co., Ltd.) and 41.0 parts by mass (molybdenum element: 0.28 mol) of molybdenum trioxide (produced by Wako Pure Chemical Industries, Ltd.) were charged. Then, the temperature was increased to 700° C. at a heating rate of 600° C./hour in an air atmosphere. Subsequently, heating was performed at 700° C. for 3 hours and then the temperature was reduced to ordinary temperature by natural air cooling. Hereby, an intermediate product containing magnesium molybdate was produced. With 23.4 parts by mass of the intermediate product, 14.3 parts by mass (aluminum element: 0.18 mol) of aluminum hydroxide (fine-grain aluminum hydroxide BF013 produced by Nippon Light Metal Company, Ltd.) was mixed to form a mixture. The mixture was charged into an alumina crucible, and the temperature was increased to 1500° C. at a heating rate of 200° C./hour. Subsequently, heating was performed at 1500° C. for 12 hours and then the temperature was reduced to ordinary temperature by natural air cooling. Hereby, a fired block was prepared. The fired block was pulverized with a ball mill for 12 hours, and the resulting powder was cleaned with hot water and then screened through a mesh sieve having an opening of 75 μm. The powder particles passed through the sieve were used as spinel particles (A-1). The spinel particles had an average diameter of 45 μm and a molybdenum content of 0.30% by mass in terms of molybdenum trioxide. The crystallite diameter of the [111] plane of the spinel particles was 290 nm.

The average diameter, molybdenum content, crystallite diameter, and crystal peak intensity ratio of the spinel particles were determined by the following methods (the same applies to the synthesis examples below).

<Average Diameter>

The average diameter of the spinel particles (A) was measured by observing the spinel particles (A) with a scanning electron microscope (SEM). Specifically, a surface viewer VE-9800 (produced by Keyence Corporation) was used for the measurement of average diameter.

<Molybdenum Content>

The molybdenum content in the spinel particles (A) was measured by X-ray fluorescence analysis (XRF). Specifically, an X-ray fluorescence spectrometer ZSX100e (produced by Rigaku Corporation) was used for the measurement. The measurement method used was an FP (function point) method. The measurement was conducted under the following conditions: EZ scan; measurement range: B to U; measurement diameter: 10 mm; sample weight: 50 mg. The spinel particles (A) were subjected to the measurement in a powder form. In the measurement, a polypropylene (PP) film was used for preventing the flying of the powder.

<Crystallite Diameter>

The crystallite diameters of the [111] and [311] planes of the spinel particles (A) were measured. Specifically, the measurement was conducted using an X-ray diffractometer SmartLab (produced by Rigaku Corporation) and a high-intensity high-resolution analyzer (CALSA) (produced by Rigaku Corporation), which is a detector. The analysis software used was PDXL. The measurement was conducted using a powder X-ray diffraction method. The analysis was conducted using the CALSA function of PDXL. The crystallite diameter of the [111] plane was calculated using the Scherrer equation on the basis of the half-width of the peak that occurred around $2\theta=19$ degrees. The crystallite diameter of the [311] plane was calculated using the Scherrer equation on the basis of the half-width of the peak that occurred around $2\theta=37$ degrees. The measurement was conducted under the following conditions: measurement method: a $2\theta/\theta$ method, tube voltage: 45 kV, tube current: 200 mA; scan speed: 0.05 degrees/minute; scan range: 10 to 70 degrees, step: 0.002 degrees; $\beta s=20$ rpm. The standard width of the apparatus was set to 0.026 degrees, which was calculated using the standard silicon powder (NIST, 640d) prepared by The National Institute of Standards and Technology of the United States.

Synthesis Example 2

Synthesis of Spinel Particles (A-2)

Into an alumina crucible, 1.00 parts by mass (aluminum element: 19.6 mmol) of aluminum oxide (produced by Wako Pure Chemical Industries, Ltd.), 0.40 parts by mass (magnesium element: 9.8 mmol) of magnesium oxide (produced by Wako Pure Chemical Industries, Ltd.), and 2.22 parts by mass (molybdenum element: 15.5 mmol) of molybdenum trioxide (produced by Wako Pure Chemical Industries, Ltd.) were charged. Then, the temperature was increased to 1500° C. at a heating rate of 10° C./minute in an air atmosphere. Subsequently, heating was performed at 1500° C. for 12 hours and then the temperature was reduced to ordinary temperature by natural air cooling. Hereby, a fired block was prepared. The fired block was pulverized with a ball mill for 12 hours, and the resulting powder was cleaned with hot water and then screened through a mesh sieve having an opening of 75 μm. The powder particles passed through the sieve were used as spinel particles (A-2).

The spinel particles (A-2) had an average diameter of 45 μm and a molybdenum content of 0.30% by mass in terms of molybdenum trioxide. The crystallite diameter of the [111] plane of the spinel particles was 280 nm.

Synthesis Example 3

Synthesis of Spinel Particles (A-3)

Spinel particles (A-3) were prepared as in Synthesis example 2, except that 1.53 parts by mass (aluminum element: 9.8 mmol) of aluminum hydroxide (produced by Wako Pure Chemical Industries, Ltd.) was used instead of 1.00 parts by mass of aluminum oxide. The spinel particles had an average diameter of 6 μm and a molybdenum content of 0.15% by mass in terms of molybdenum trioxide. The crystallite diameter of the [111] plane of the spinel particles was 270 nm.

All of the untreated spinel particle samples prepared in Synthesis examples 1 to 3 included molybdenum and a [111] plane having a crystallite diameter of 220 nm or more and had an average diameter of 0.1 to 1000 μm. Thus, the untreated spinel particle samples prepared in Synthesis examples 1 to 3 were untreated spinel particles most suitable for the surface treatment.

Comparative Synthesis Example 1

Synthesis of Comparative Untreated Spinel Particles (HA-1)

Untreated spinel particles were synthesized in accordance with the description of Example 1 in Japanese Unexamined Patent Application Publication No. 2016-121049. Hereby, a publicly known and commonly used spinel powder (HA-1) having an average particle diameter of 45 μm was prepared.

Comparative Synthesis Example 2

Synthesis of Spinel Particles (HA-2)

With 100 parts by mass of an aluminum oxide powder DAW-07 (Denka Company Limited.) having an average particle diameter of 5 μm, 40 parts by mass of magnesium oxide ("STARMAG U" produced by Konoshima Chemical Co., Ltd.) and 0.1 parts by mass of sodium chloride were mixed. The resulting mixture was charged into a firing sheath and fired in an atmosphere of 1150° C. for 6 hours at atmospheric pressure. Hereby, a publicly known and commonly used spinel powder (HA-2) having an average particle diameter of 6 μm was prepared.

The untreated spinel particle samples prepared in Comparative synthesis examples 1 and 2 did not include molybdenum and were not suitable for the surface treatment. Visual inspection of the spinel particle samples confirmed aggregation of particles. It was considered impossible for the spinel particle samples to have high dispersibility and high dispersion stability in the high-molecular weight organic compound.

Table 1 describes the spinel particle samples synthesized.

TABLE 1

|  |  | Synthesis example 1 | Synthesis example 2 | Synthesis example 3 | Comparative synthesis example 1 | Comparative synthesis example 2 |
| --- | --- | --- | --- | --- | --- | --- |
| Spinel Particles (A) |  | A-1 | A-2 | A-3 | HA-1 | HA-2 |
| Average Diameter (μm) |  | 45 | 45 | 6 | 45 | 6 |
| Molybdenum content (mass %) |  | 0.30 | 0.30 | 0.15 | — | — |
| Crystallite diameter (nm) | [111] Plane | 290 | 280 | 270 | 150 | 170 |
|  | [311] Plane | 270 | 270 | 270 | 170 | 180 |
| Crystal peak intensity ratio [111] plane/[311] plane |  | 0.365 | 0.362 | 0.360 | 0.286 | 0.291 |

Example 1

Synthesis of Surface-Treated Spinel (B) (F-1)

To a 500-mL separable flask equipped with a thermometer, a stirrer, and a reflux condenser, 100 parts by mass of the spinel particles (A-1) synthesized in Synthesis example 1, 0.005 parts by mass of water, and 100 parts by mass of methyl ethyl ketone were added while the flask was purged with a nitrogen gas. The resulting mixture was stirred. To the resulting slurry, 0.5 parts by mass of γ-glycidoxypropyltrimethoxysilane was added. The resulting mixture was heated to 80° C. and then further stirred for another 10 hours. Subsequently, the mixture was filtered to separate a solid, which was cleaned with methyl ethyl ketone. The resulting filter cake was dried at 200° C. for 2 hours. Hereby, surface-treated spinel particles (B) (F-1) that included the spinel particles and a cured product of the silane compound which was deposited on at least a portion of the surface of each of the spinel particles were prepared. The amount of the surface treatment layer deposited on the surfaces of the surface-treated spinel particles (B) per square meter was 0.03 g.

The amount of the surface treatment layer deposited on the surfaces of the surface-treated spinel particles per square meter and the state in which the surface treatment layer was deposited on the surfaces of the surface-treated spinel particles were determined by the following methods (the same applies to the examples below).

<Amount of Surface Treatment Layer Per Square Meter>

The amount of the surface treatment layer deposited on the surfaces of the surface-treated spinel particles (B) per square meter is the value (a/b) determined by dividing a reduction (a) in the weight of the surface-treated spinel particles (B) relative to 1 g of the surface-treated spinel particles (B) which is determined from a reduction in the mass of the surface-treated spinel particles (B) during heating from 200° C. to 500° C. which is measured when the surface-treated spinel particles (B) are heated from room temperature: 25° C. to 500° C. in an air atmosphere at 10°

C./minute with a thermogravimetric analyzer (TGA), by the surface area (b) of the surface-treated spinel particles (B) per gram which is measured using BET specific surface area.

Example 2

Synthesis of Surface-Treated Spinel (B) (F-2)

To a 500-mL separable flask equipped with a thermometer, a stirrer, and a reflux condenser, 100 parts by mass of the spinel particles (A-1) synthesized in Synthesis example 1, 0.005 parts by mass of water, and 100 parts by mass of methyl ethyl ketone were added while the flask was purged with a nitrogen gas. The resulting mixture was stirred. To the resulting slurry, 0.5 parts by mass of N-phenyl-γ-aminopropyltrimethoxysilane was added. The resulting mixture was heated to 80° C. and then further stirred for another 10 hours. Subsequently, the mixture was filtered to separate a solid, which was cleaned with methyl ethyl ketone. The resulting filter cake was dried at 200° C. for 2 hours. Hereby, surface-treated spinel particles (B) (F-2) that included the spinel particles and a cured product of the silane compound which was deposited on at least a portion of the surface of each of the spinel particles were prepared. The amount of the surface treatment layer deposited on the surfaces of the surface-treated spinel particles (B) per square meter was 0.023 g.

Example 3

Synthesis of Surface-Treated Spinel (B) (F-3)

Into a 100-ml polytetrafluoroethylene container, 40 parts by mass of the spinel particles (A-1) synthesized in Synthesis example 1 and a 5-ml glass container that contained 2 parts by mass of γ-glycidoxypropyltrimethoxysilane were charged such that the spinel particles (A-1) did not come into direct contact with γ-glycidoxypropyltrimethoxysilane. After the polytetrafluoroethylene container had been covered with a lid, the polytetrafluoroethylene container was placed in a stainless steel, high-pressure reaction container. Then, heating was performed for 16 hours in a dryer at 150° C. Hereby, surface-treated spinel particles (F-3) that included the spinel particles and a surface treatment layer that included a cured product of the silane compound and was deposited uniformly on the surfaces of the spinel particles were prepared. The amount of the surface treatment layer deposited on the surfaces of the surface-treated spinel particles per square meter was 0.01 g.

<State of Deposition of Surface Treatment Layer>

The surface-treated spinel particles (B) (F-3) were deposited on platinum by vapor deposition. A randomly selected surface-treated spinel particle was subjected to a SEM-EDS analysis twice using a scanning electron microscope (SEM, JSM7800F) produced by JEOL Ltd. and an energy dispersive X-ray spectroscopy (EDS, X-MAX 80 mm$^2$) produced by Oxford while the angle was adjusted such that a plurality of automorphic planes were contained within the field of view. The results of the analysis confirmed that silicon derived from γ-glycidoxypropyltrimethoxysilane was present uniformly on several automorphic planes of the spinel particle and the surface treatment layer had excellent uniformity.

Figure 2:
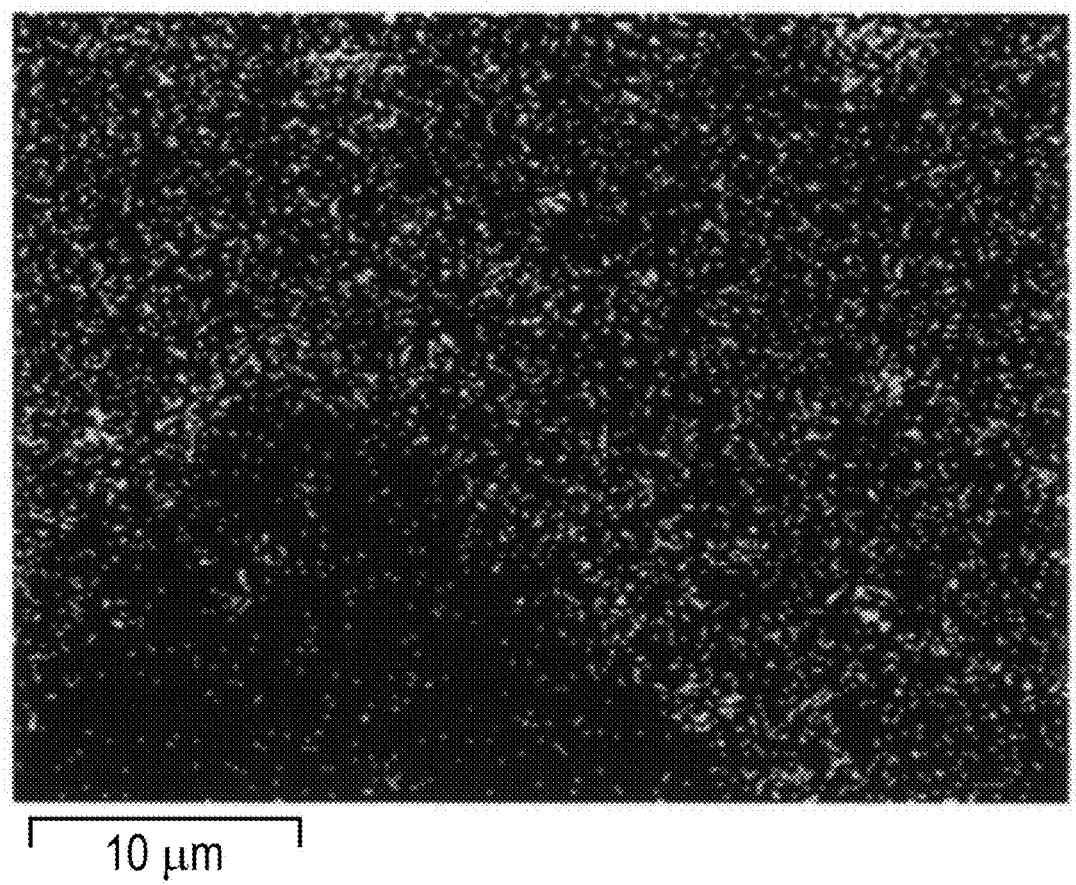
FIG. 2 is a diagram illustrating a silicon atom mapping image that corresponds to the SEM-EDS image of the surface-treated spinel particles (F-3) prepared in Example 3.
Figure 3:
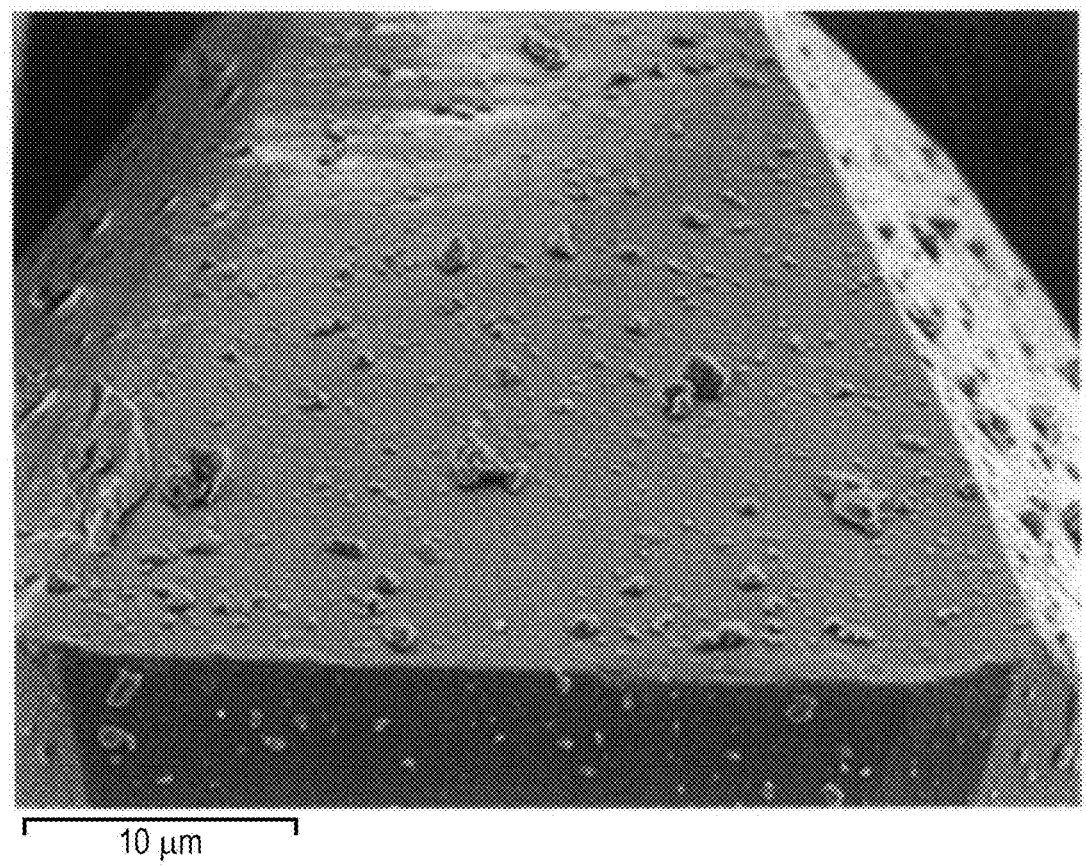
FIG. 3 is a diagram illustrating another SEM-EDS image of the surface-treated spinel particles (F-3) prepared in Example 3 which was taken at an angle different from that at which the SEM-EDS image of FIG. 1 was taken.
Figure 4:
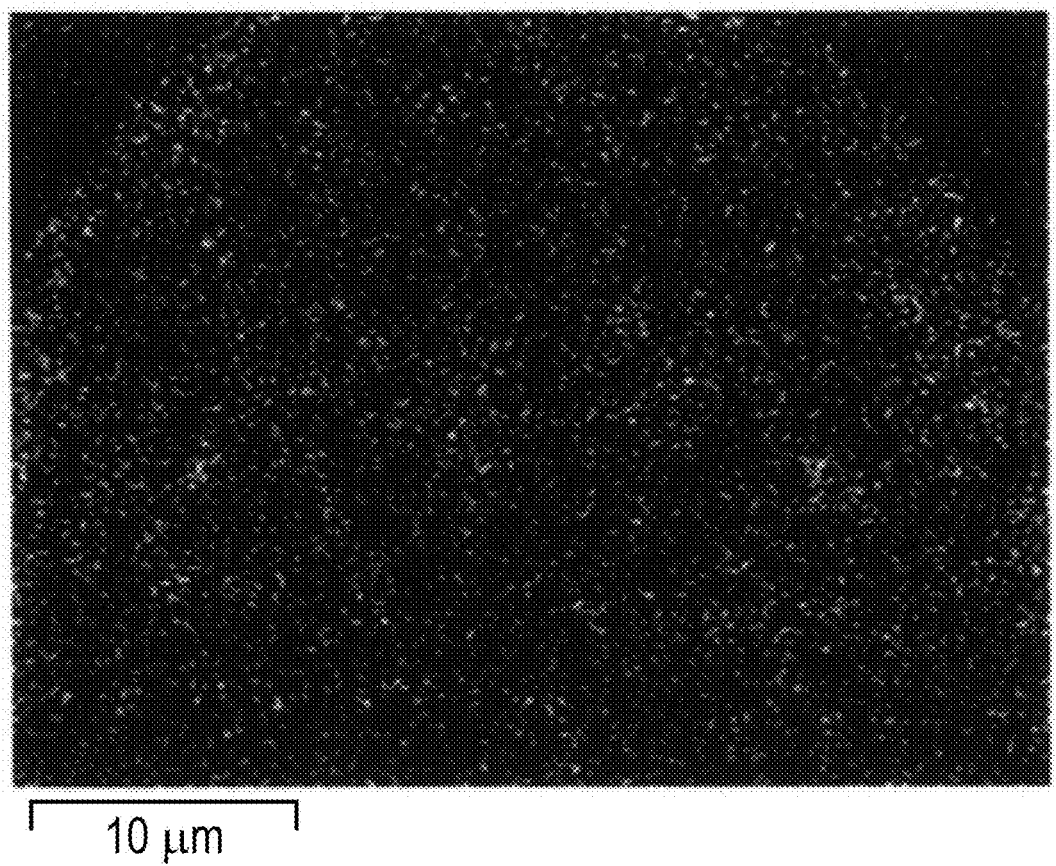
FIG. 4 is a diagram illustrating a silicon atom mapping image that corresponds to the other SEM-EDS image of the surface-treated spinel particles (F-3) prepared in Example 3 which was taken at an angle different from that at which the SEM-EDS image of FIG. 1 was taken.

FIGS. 1 and 3 illustrate SEM images obtained by subjecting the surface-treated spinel particles (F-3) prepared in Example 3 to the SEM-EDS analysis while the angle was adjusted such that a plurality of automorphic planes were contained within the field of view. It is understood that the automorphic planes present prior to the surface treatment were substantially maintained even after the formation of the surface treatment layer and a thin surface treatment layer was formed on the automorphic planes. It is confirmed that each of the planes had excellent flatness. FIGS. 2 and 4 are silicon atom mapping images corresponding to FIGS. 1 and 3, respectively. The yellow dots denote silicon atoms. The density of the dots substantially does not vary and is uniform in any of the automorphic planes.

Note that, the deposition of the organic compound or the like on the spinel particles (A-1) which had not been subjected to the surface treatment was not confirmed, since the mass of the spinel particles (A-1), which had not been subjected to the surface treatment, was not reduced during heating from 200° C. to 500° C. when the spinel particles (A-1) were heated from room temperature: 25° C. to 500° C. in an air atmosphere at 10° C./minute with a thermogravimetric analyzer (TGA) and the presence of silicon was not confirmed in the SEM-EDS analysis. The deposition of the organic compound or the like on the spinel particle samples (A-2) and (A-3) was also not confirmed.

Whether the surface-treated spinel particle samples (B) prepared in Examples above included molybdenum and the crystallite diameter of the [111] plane were substantially not affected by the surface treatment. Moreover, visual inspection of the spinel particle samples did not confirm significant aggregation of particles. Thus, it was confirmed that the spinel particle samples had high dispersibility and high dispersion stability in the high-molecular weight organic compound.

Example 4

Synthesis of Surface-Treated Spinel (B) (F-4)

Into a 100-ml polytetrafluoroethylene container, 40 parts by mass of the spinel particles (B-1) synthesized in Synthesis example 1 and a 5-ml glass container that contained 2 parts by mass of N-phenyl-γ-aminopropyltrimethoxysilane were charged such that the spinel particles (A-1) did not come into direct contact with N-phenyl-γ-aminopropyltrimethoxysilane. After the polytetrafluoroethylene container had been covered with a lid, the polytetrafluoroethylene container was placed in a stainless steel, high-pressure reaction container. Then, heating was performed for 16 hours in a dryer at 150° C. Hereby, surface-treated spinel particles (B) (F-4) that included the spinel particles and a surface treatment layer that included a cured product of the silane compound and was deposited uniformly on the surfaces of the spinel particles were prepared. The amount of the surface treatment layer deposited on the surfaces of the surface-treated spinel particles per square meter was 0.005 g.

Example 5

Synthesis of Surface-Treated Spinel (B) (F-5)

To a 500-mL separable flask equipped with a thermometer, a stirrer, and a reflux condenser, 100 parts by mass of the spinel particles (A-2) synthesized in Synthesis example 2, 0.005 parts by mass of water, and 100 parts by mass of methyl ethyl ketone were added while the flask was purged with a nitrogen gas. The resulting mixture was stirred. To the resulting slurry, 0.5 parts by mass of γ-glycidoxypropyltrimethoxysilane was added. The resulting mixture was heated to 80° C. and then further stirred for another 10 hours. Subsequently, the mixture was filtered to separate a solid, which was cleaned with methyl ethyl ketone. The resulting filter cake was dried at 200° C. for 2 hours. Hereby, surface-treated spinel particles (B) (F-5) that included the spinel particles and a cured product of the silane compound which was deposited on at least a portion of the surface of each of the spinel particles were prepared. The amount of the surface treatment layer deposited on the surfaces of the surface-treated spinel particles per square meter was 0.03 g.

Example 6

Synthesis of Surface-Treated Spinel (B) (F-6)

To a 500-mL separable flask equipped with a thermometer, a stirrer, and a reflux condenser, 100 parts by mass of the spinel particles (A-2) synthesized in Synthesis example 2, 0.005 parts by mass of water, and 100 parts by mass of methyl ethyl ketone were added while the flask was purged with a nitrogen gas. The resulting mixture was stirred. To the resulting slurry, 0.5 parts by mass of N-phenyl-γ-aminopropyltrimethoxysilane was added. The resulting mixture was heated to 80° C. and then further stirred for another 10 hours. Subsequently, the mixture was filtered to separate a solid, which was cleaned with methyl ethyl ketone. The resulting filter cake was dried at 200° C. for 2 hours. Hereby, surface-treated spinel particles (B) (F-6) that included the spinel particles and a cured product of the silane compound which was deposited on at least a portion of the surface of each of the spinel particles were prepared. The amount of the surface treatment layer deposited on the surfaces of the surface-treated spinel particles per square meter was 0.025 g.

Example 7

Synthesis of Surface-Treated Spinel (B) (F-7)

Into a 100-ml polytetrafluoroethylene container, 40 parts by mass of the spinel particles (A-2) synthesized in Synthesis example 1 and a 5-ml glass container that contained 2 parts by mass of γ-glycidoxypropyltrimethoxysilane were charged such that the spinel particles (A-2) did not come into direct contact with γ-glycidoxypropyltrimethoxysilane. After the polytetrafluoroethylene container had been covered with a lid, the polytetrafluoroethylene container was placed in a stainless steel, high-pressure reaction container. Then, heating was performed for 16 hours in a dryer at 150° C. Hereby, surface-treated spinel particles (B) (F-7) that included the spinel particles and a surface treatment layer that included a cured product of the silane compound and was deposited uniformly on the surfaces of the spinel particles were prepared. The amount of the surface treatment layer deposited on the surfaces of the surface-treated spinel particles per square meter was 0.015 g.

Example 8

Synthesis of Surface-Treated Spinel (B) (F-8)

Into a 100-ml polytetrafluoroethylene container, 40 parts by mass of the spinel particles (A-2) synthesized in Synthesis example 1 and a 5-ml glass container that contained 2 parts by mass of N-phenyl-γ-aminopropyltrimethoxysilane were charged such that the spinel particles (A-2) did not come into direct contact with N-phenyl-γ-aminopropyltrimethoxysilane. After the polytetrafluoroethylene container had been covered with a lid, the polytetrafluoroethylene container was placed in a stainless steel, high-pressure reaction container. Then, heating was performed for 16 hours in a dryer at 150° C. Hereby, surface-treated spinel particles (B) (F-8) that included the spinel particles and a surface treatment layer that included a cured product of the silane compound and was deposited uniformly on the surfaces of the spinel particles were prepared. The amount of the surface treatment layer deposited on the surfaces of the surface-treated spinel particles per square meter was 0.008 g.

Example 9

Synthesis of Surface-Treated Spinel (F-9)

Into a 100-ml polytetrafluoroethylene container, 40 parts by mass of the spinel particles (A-1) synthesized in Synthesis example 1 and a 5-ml glass container that contained 2 parts by mass of phenyltrimethoxysilane were charged such that the spinel particles (A-1) did not come into direct contact with phenyltrimethoxysilane. After the polytetrafluoroethylene container had been covered with a lid, the polytetrafluoroethylene container was placed in a stainless steel, high-pressure reaction container. Then, heating was performed for 16 hours in a dryer at 150° C. Hereby, surface-treated spinel particles (F-9) that included the spinel particles and a surface treatment layer that included a cured product of the silane compound and was deposited uniformly on the surfaces of the spinel particles were prepared. The amount of the surface treatment layer deposited on the surfaces of the surface-treated spinel particles per square meter was 0.013 g.

Example 10

Synthesis of Surface-Treated Spinel (F-10)

Into a 100-ml polytetrafluoroethylene container, 40 parts by mass of the spinel particles (A-1) synthesized in Synthesis example 1 and a 5-ml glass container that contained 2 parts by mass of vinyltrimethoxysilane were charged such that the spinel particles (A-1) did not come into direct contact with vinyltrimethoxysilane. After the polytetrafluoroethylene container had been covered with a lid, the polytetrafluoroethylene container was placed in a stainless steel, high-pressure reaction container. Then, heating was performed for 16 hours in a dryer at 100° C. Hereby, surface-treated spinel particles (F-10) that included the spinel particles and a surface treatment layer that included a cured product of the silane compound and was deposited uniformly on the surfaces of the spinel particles were prepared. The amount of the surface treatment layer deposited on the surfaces of the surface-treated spinel particles per square meter was 0.02 g.

Example 11

Synthesis of Surface-Treated Spinel (F-11)

Surface-treated spinel particles (F-23) were prepared as in Example 9, except that the spinel particles (A-1) were replaced with the spinel particles (A-2). The amount of the surface treatment layer deposited on the surfaces of the surface-treated spinel particles per square meter was 0.02 g.

Example 12

Synthesis of Surface-Treated Spinel (F-12)

Surface-treated spinel particles (F-12) were prepared as in Example 3, except that the spinel particles (A-1) were replaced with the spinel particles (A-3). The amount of the surface treatment layer deposited on the surfaces of the surface-treated spinel particles per square meter was 0.01 g.

Example 13

Synthesis of Surface-Treated Spinel (F-13)

Surface-treated spinel particles (F-13) were prepared as in Example 4, except that the spinel particles (A-1) were replaced with the spinel particles (A-3). The amount of the surface treatment layer deposited on the surfaces of the surface-treated spinel particles per square meter was 0.006 g.

Example 14

Synthesis of Surface-Treated Spinel (F-14)

Surface-treated spinel particles (F-14) were prepared as in Example 9, except that the spinel particles (A-1) were replaced with the spinel particles (A-3). The amount of the surface treatment layer deposited on the surfaces of the surface-treated spinel particles per square meter was 0.016 g.

Example 15

Synthesis of Surface-Treated Spinel (F-15)

To a 500-mL separable flask equipped with a thermometer, a stirrer, and a reflux condenser, 100 parts by mass of the spinel particles (A-2) synthesized in Synthesis example 2, 0.005 parts by mass of water, and 100 parts by mass of octanol were added while the flask was purged with a nitrogen gas. The resulting mixture was stirred. To the resulting slurry, 0.5 parts by mass of octadecylpropyltrimethoxysilane was added. The resulting mixture was heated to 100° C. and then further stirred for another 10 hours. Subsequently, the mixture was filtered to separate a solid, which was cleaned with toluene. The resulting filter cake was dried at 200° C. for 2 hours. Hereby, surface-treated spinel particles (F-15) that included the spinel particles and a cured product of the silane compound which was deposited on at least a portion of the surface of each of the spinel particles were prepared. The amount of the surface treatment layer deposited on the surfaces of the surface-treated spinel particles per square meter was 0.015 g.

Example 16

Synthesis of Surface-Treated Spinel (F-16)

To a 500-mL separable flask equipped with a thermometer, a stirrer, and a reflux condenser, 100 parts by mass of the spinel particles (A-2) synthesized in Synthesis example 2, 0.005 parts by mass of water, and 100 parts by mass of octanol were added while the flask was purged with a nitrogen gas. The resulting mixture was stirred. To the resulting slurry, 0.5 parts by mass of isopropyl triisostearoyl titanate was added. The resulting mixture was heated to 100° C. and then further stirred for another 10 hours. Subsequently, the mixture was filtered to separate a solid, which was cleaned with toluene. The resulting filter cake was dried at 100° C. for 2 hours. Hereby, surface-treated spinel particles (F-16) that included the spinel particles and a cured product of the titanium compound which was deposited on at least a portion of the surface of each of the spinel particles were prepared. The amount of the surface treatment layer deposited on the surfaces of the surface-treated spinel particles per square meter was 0.013 g.

Example 17

Synthesis of Surface-Treated Spinel (F-17)

To a 500-mL separable flask equipped with a thermometer, a stirrer, and a reflux condenser, 100 parts by mass of the spinel particles (A-2) synthesized in Synthesis example 2, 0.005 parts by mass of water, and 100 parts by mass of tetrahydrofuran were added while the flask was purged with a nitrogen gas. The resulting mixture was stirred. To the resulting slurry, 0.5 parts by mass of octadecylphosphonic acid was added. The resulting mixture was heated to 60° C. and then further stirred for another 10 hours. Subsequently, the mixture was filtered to separate a solid, which was cleaned with tetrahydrofuran. The resulting filter cake was dried at 100° C. for 2 hours. Hereby, surface-treated spinel particles (F-17) that included the spinel particles and the phosphate compound which was deposited on at least a portion of the surface of each of the spinel particles by adsorption were prepared. The amount of the surface treatment layer deposited on the surfaces of the surface-treated spinel particles per square meter was 0.012 g.

Example 18

Synthesis of Surface-Treated Spinel (F-18)

Surface-treated spinel particles (F-18) were prepared as in Example 15, except that the spinel particles (A-2) were replaced with the spinel particles (A-3). The amount of the surface treatment layer deposited on the surfaces of the surface-treated spinel particles per square meter was 0.027 g.

Example 19

Synthesis of Surface-Treated Spinel (F-19)

Surface-treated spinel particles (F-19) were prepared as in Synthesis example 8 Example 16, except that the spinel particles (A-2) were replaced with the spinel particles (A-3). The amount of the surface treatment layer deposited on the surfaces of the surface-treated spinel particles per square meter was 0.023 g.

Example 20

Synthesis of Surface-Treated Spinel (F-20)

Surface-treated spinel particles (F-20) were prepared as in Example 17, except that the spinel particles (A-2) were replaced with the spinel particles (A-3). The amount of the surface treatment layer deposited on the surfaces of the surface-treated spinel particles per square meter was 0.02 g.

Whether the surface-treated spinel particles (B) prepared in each of the synthesis examples above included molybdenum and the crystallite diameter of the [111] plane of the surface-treated spinel particles (B) were substantially not affected by the surface treatment. The SEM image and silicon atom mapping image obtained by the SEM-EDS analysis of each of the surface-treated spinel particle samples (B) prepared in Examples 4, 7, 8, and 9 to 14 were visually substantially the same as those measured in Example 3 except for the difference in the number of automorphic planes present in the field of view. That is, each of the planes was flat and had uniform silicon distribution. Thus, it was considered that the degree of uniformity of the thickness of the surface treatment layer was high.

In addition, visual inspection of the spinel particles did not confirm significant aggregation of particles. Thus, it was confirmed that the spinel particles had high dispersibility and high dispersion stability in the high-molecular weight organic compound. As for the surface-treated spinel particle samples prepared in Examples 3, 4, 7, 8, and 9 to 14, the crystallite diameter of the [111] plane of the untreated spinel particles, which are raw materials, was larger than that of the raw material spinel particles used in any other synthesis example. It was considered that the surface-treated spinel particle samples prepared in Examples 3, 4, 7, 8, and 9 to 14 had excellent thermal conductivity even after the surface treatment due to the properties of the raw material spinel particles.

Comparative Example 1

Synthesis of Comparative Surface-Treated Spinel (HF-1)

To a 500-mL separable flask equipped with a thermometer, a stirrer, and a reflux condenser, 100 parts by mass of the comparative untreated spinel particles (HA-1) synthesized in Comparative synthesis example 1, 0.005 parts by mass of water, and 100 parts by mass of methyl ethyl ketone were added while the flask was purged with a nitrogen gas. The resulting mixture was stirred. To the resulting slurry, 0.5 parts by mass of γ-glycidoxypropyltrimethoxysilane was added. The resulting mixture was heated to 80° C. and then further stirred for another 10 hours. Subsequently, the mixture was filtered to separate a solid, which was cleaned with methyl ethyl ketone. The resulting filter cake was dried at 200° C. for 2 hours. Hereby, comparative surface-treated spinel particles (HF-1) that included the spinel particles and a cured product of the silane compound which was deposited on at least a portion of the surface of each of the spinel particles were prepared. The amount of the surface treatment layer deposited on the surfaces of the comparative surface-treated spinel particles per square meter was 0.04 g.

Comparative Example 2

Synthesis of Comparative Surface-Treated Spinel (HF-2)

To a 500-mL separable flask equipped with a thermometer, a stirrer, and a reflux condenser, 100 parts by mass of the comparative untreated spinel particles (HA-1) synthesized in Comparative synthesis example 1, 0.005 parts by mass of water, and 100 parts by mass of methyl ethyl ketone were added while the flask was purged with a nitrogen gas. The resulting mixture was stirred. To the resulting slurry, 0.5 parts by mass of N-phenyl-γ-aminopropyltrimethoxysilane was added. The resulting mixture was heated to 80° C. and then further stirred for another 10 hours. Subsequently, the mixture was filtered to separate a solid, which was cleaned with methyl ethyl ketone. The resulting filter cake was dried at 200° C. for 2 hours. Hereby, comparative surface-treated spinel particles (HF-2) that included the spinel particles and a cured product of the silane compound which was deposited on at least a portion of the surface of each of the spinel particles were prepared. The amount of the surface treatment layer deposited on the surfaces of the comparative surface-treated spinel particles (HF-2) per square meter was 0.03 g.

Comparative Example 3

Synthesis of Comparative Surface-Treated Spinel (HF-3)

Into a 100-ml polytetrafluoroethylene container, 40 parts by mass of the comparative untreated spinel particles (HA-1) synthesized in Comparative synthesis example 1 and a 5-ml glass container that contained 2 parts by mass of γ-glycidoxypropyltrimethoxysilane were charged such that the comparative untreated spinel particles (HA-1) did not come into direct contact with γ-glycidoxypropyltrimethoxysilane. After the polytetrafluoroethylene container had been covered with a lid, the polytetrafluoroethylene container was placed in a stainless steel, high-pressure reaction container. Then, heating was performed for 16 hours in a dryer at 150° C. Hereby, comparative surface-treated spinel particles (HF-3) that included the spinel particles and a surface treatment layer that included a cured product of the silane compound and was deposited uniformly on the surfaces of the spinel particles were prepared. The amount of the surface treatment layer deposited on the surfaces of the comparative surface-treated spinel particles per square meter was 0.02 g.

Comparative Example 4

Synthesis of Comparative Surface-Treated Spinel (HF-4)

Into a 100-ml polytetrafluoroethylene container, 40 parts by mass of the comparative untreated spinel particles (HA-1) synthesized in Comparative synthesis example 1 and a 5-ml glass container that contained 2 parts by mass of N-phenyl-γ-aminopropyltrimethoxysilane were charged such that the comparative untreated spinel particles (HA-1) did not come into direct contact with N-phenyl-γ-aminopropyltrimethoxysilane. After the polytetrafluoroethylene container had been covered with a lid, the polytetrafluoroethylene container was placed in a stainless steel, high-pressure reaction container. Then, heating was performed for 16 hours in a dryer at 150° C. Hereby, comparative surface-treated spinel particles (HF-4) that included the spinel particles and a surface treatment layer that included a cured product of the silane compound and was deposited uniformly on the surfaces of the spinel particles were prepared. The amount of the surface treatment layer deposited on the surfaces of the comparative surface-treated spinel particles (HF-4) per square meter was 0.015 g.

Comparative Example 5

Synthesis of Surface-Treated Spinel (HF-5)

Surface-treated spinel particles (HF-5) were prepared as in Comparative example 3, except that the spinel particles (HA-1) were replaced with the spinel particles (HA-2). The amount of the surface treatment layer deposited on the surfaces of the surface-treated spinel particles per square meter was 0.02 g.

Tables 2-1 to 2-4 describe the surface-treated spinel particle samples (B) prepared.

TABLE 2

|  | Example 1 | Example 2 | Example 3 | Example 4 | Example 5 | Example 6 | Example 7 | Example 8 |
|---|---|---|---|---|---|---|---|---|
| Surface-treated spinel particles (B) | F-1 | F-2 | F-3 | F-4 | F-5 | F-6 | F-7 | F-8 |
| Spinel particles (A) | A-1 | A-1 | A-1 | A-1 | A-2 | A-2 | A-2 | A-2 |
| Organic compound | γ-Glycidoxy-propyltri-methoxy-silane | N-Phenyl-γ-amino-propyltri-methoxy-silane | γ-Glycidoxy-propyltri-methoxy-silane | N-Phenyl-γ-amino-propyltri-methoxy-silane | γ-Glycidoxy-propyltri-methoxy-silane | N-Phenyl-γ-amino-propyltri-methoxy-silane | γ-Glycidoxy-propyltri-methoxy-silane | N-Phenyl-γ-amino-propyltri-methoxy-silane |
| Surface treatment method | Wet process | Wet process | CVD method | CVD method | Wet process | Wet process | CVD method | CVD method |
| Surface treatment amount (g/m²) | 0.030 | 0.023 | 0.010 | 0.005 | 0.030 | 0.025 | 0.015 | 0.008 |

TABLE 3

|  | Example 9 | Example 10 | Example 11 | Example 12 | Example 13 | Example 14 |
|---|---|---|---|---|---|---|
| Surface-treated spinel particles (B) | F-9 | F-10 | F-11 | F-12 | F-13 | F-14 |
| Spinel particles (A) | A-1 | A-1 | A-2 | A-3 | A-3 | A-3 |
| Organic compound | Phenyl-trimeth-oxy-silane | Vinyl-trimeth-oxy-silane | Phenyl-trimeth-oxy-silane | γ-Glycid-oxypropyl-trimeth-oxysilane | N-Phenyl-γ-aminopropyl-trimeth-oxysilane | Phe-nyl-tri-methoxy silane |
| Surface treatment method | CVD method | CVD method | CVD method | CVD method | CVD method | CVD method |
| Surface treatment amount (g/m²) | 0.013 | 0.020 | 0.020 | 0.010 | 0.006 | 0.016 |

TABLE 4

|  | Example 15 | Example 16 | Example 17 | Example 18 | Example 19 | Example 20 |
|---|---|---|---|---|---|---|
| Surface-treated spinel particles (B) | F-15 | F-16 | F-17 | F-18 | F-19 | F-20 |
| Spinel particles (A) | A-2 | A-2 | A-2 | A-3 | A-3 | A-3 |
| Organic compound | Octa-decyl-propyltri-methoxy-silane | Iso-propyl-triiso-stearoyl-titanate | Octa-decyl-phos-phonic acid | Octa decyl propyltri-methoxy-silane | Iso-propyl-triiso-stearoyl-titanate | Octa-decyl-phos-phonic acid |
| Surface treatment method | Wet process | Wet process | Wet process | Wet process | Wet process | Wet process |
| Surface treatment amount (g/m²) | 0.015 | 0.013 | 0.012 | 0.027 | 0.023 | 0.020 |

TABLE 5

| Table 2-4 | Comparative example 1 | Comparative example 2 | Comparative example 3 | Comparative example 4 | Comparative example 5 |
|---|---|---|---|---|---|
| Comparative surface-treated spinel particles | HF-1 | HF-2 | HF-3 | HF-4 | HF-5 |
| Spinel particles (A) | HA-1 | HA-1 | HA-1 | HA-1 | HA-2 |
| Organic compound | γ-Glycidoxypropyl-trimethoxy-silane | N-Phenyl-γ-aminopropyltri-methoxysilane | γ-Glycidoxypropyl-trimethoxy-silane | N-Phenyl-γ-aminopropyltri-methoxysilane | γ-Glycidoxypropyl-trimethoxy-silane |
| Surface treatment method | Wet process | Wet process | CVD method | CVD method | CVD method |
| Surface treatment amount (g/m²) | 0.040 | 0.030 | 0.020 | 0.015 | 0.020 |

Example 21

With 27.3 parts by mass of DIC-PPS LR100G (Y-1, polyphenylene sulfide resin produced by DIC Corporation, density: 1.35 g/cm3), which is a thermoplastic resin, 72.7 parts by mass of the surface-treated spinel (F-1) was mixed uniformly by dry blending. The resulting mixture was melt-kneaded with a resin melt kneader Labo Plastomill at a kneading temperature of 300° C. and a rotation speed of 80 rpm. Hereby, a polyphenylene sulfide resin composition that included a thermally conductive filler at a filling ratio of 50 volume % was prepared. The content (volume %) of the filler in the resin composition was calculated on the basis of the densities of the thermoplastic resin and the thermally conductive filler.

(Method for Measuring Thermal Conductivity of Thermoplastic Resin Composition)

The resin composition was charged into a metal mold and hot-pressed at a molding temperature of 300° C. into a press-molded body having a thickness of 0.5 mm. A 10 mm×10 mm sample was taken from the press-molded body, and the thermal conductivity of the sample at 25° C. was measured with a thermal conductivity meter (LFA467 HyperFlash, produced by NETZSCH).

Examples 22 to 28 and Comparative Examples 6 to 12

A thermoplastic resin composition was prepared as in Example 21 at the mixing ratio described in Tables 3-1 to 3-4, and the thermal conductivity of the thermoplastic resin composition was measured as in Example 21.

TABLE 6

| Table 3-1 | | Example 21 | Example 22 | Example 23 | Example 24 |
|---|---|---|---|---|---|
| Surface-treated spinel particles (B) | Type | F-1 | F-2 | F-3 | F-4 |
| | Amount (mass part) | 72.7 | 72.7 | 72.7 | 72.7 |
| High-molecular weight organic compound (C) | LR100G (PPS) | 27.3 | 27.3 | 27.3 | 27.3 |

TABLE 6-continued

| Table 3-1 | Example 21 | Example 22 | Example 23 | Example 24 |
|---|---|---|---|---|
| Spinel content (vol %) | 50 | 50 | 50 | 50 |
| Thermal conductivity (W/mK · 25° C.) | 1.6 | 1.6 | 1.8 | 1.8 |

TABLE 7

| Table 3-2 | | Example 25 | Example 26 | Example 27 | Example 28 |
|---|---|---|---|---|---|
| Surface-treated spinel particles (B) | Type | F-5 | F-6 | F-7 | F-8 |
| | Amount (mass part) | 72.7 | 72.7 | 72.7 | 72.7 |
| High-molecular weight organic compound (C) | LR100G (PPS) | 27.3 | 27.3 | 27.3 | 27.3 |
| Spinel content (vol %) | | 50 | 50 | 50 | 50 |
| Thermal conductivity (W/mK · 25° C.) | | 1.7 | 1.7 | 2.0 | 1.9 |

TABLE 8

| Table 3-3 | | Comparative example 6 | Comparative example 7 | Comparative example 8 | Comparative example 9 |
|---|---|---|---|---|---|
| Surface-treated spinel particles (B) | Type | A-1 | A-2 | HA-1 | HF-1 |
| | Amount (mass part) | 72.7 | 72.7 | 72.7 | 72.7 |
| High-molecular weight organic compound (C) | LR100G (PPS) | 27.3 | 27.3 | 27.3 | 27.3 |
| Spinel content (vol %) | | 50 | 50 | 50 | 50 |
| Thermal conductivity (W/mK · 25° C.) | | 1.5 | 1.5 | 1.4 | 1.5 |

TABLE 9

| Table 3-4 | | Comparative example 10 | Comparative example 11 | Comparative example 12 |
|---|---|---|---|---|
| Surface-treated spinel particles (B) | Type | HF-2 | HF-3 | HF-4 |
| | Amount (mass part) | 72.7 | 72.7 | 72.7 |
| High-molecular weight organic compound (C) | LR100G (PPS) | 27.3 | 27.3 | 27.3 |
| Spinel content (vol %) | | 50 | 50 | 50 |
| Thermal conductivity (W/mK · 25° C.) | | 1.4 | 1.5 | 1.5 |

Example 29

With 25.0 parts by mass of Iupilon S3000F (Y-2, polycarbonate resin produced by Mitsubishi Engineering-Plastics Corporation, density: 1.20 g/cm$^3$), which is a thermoplastic resin, 75.0 parts by mass of the surface-treated spinel (F-3) was mixed uniformly by dry blending. The resulting mixture was melt-kneaded with a resin melt kneader Labo Plastomill at a kneading temperature of 250° C. and a rotation speed of 80 rpm. Hereby, a polycarbonate resin composition that included a thermally conductive filler at a filling ratio of 50 volume % was prepared. The content (volume %) of the filler in the resin composition was calculated on the basis of the densities of the thermoplastic resin and the thermally conductive filler.

Comparative Example 13

A thermoplastic resin composition was prepared as in Example 29 at the mixing ratio described in Table 4, and the thermal conductivity of the thermoplastic resin composition was measured as in Example 29.

TABLE 10

| Table 4 | | Example 29 | Comparative example 13 |
|---|---|---|---|
| Surface-treated spinel particles (B) | Type | F-3 | A-1 |
| | Amount (mass part) | 75 | 75 |
| High-molecular weight organic compound (C) | S3000F (PC) | 25 | 25 |
| Spinel content (vol %) | | 50 | 50 |
| Thermal conductivity (W/mK · 25° C.) | | 1.7 | 1.5 |

Preparation Example 1

Thermosetting Resin Mixture (X-1)

A resin mixture (X-1) was prepared by mixing 60 parts by mass of EPICLON 850S (bisphenol-A-type epoxy resin, produced by DIC Corporation, epoxy equivalent weight: 188 g/eq), which is an epoxy resin, with 40 parts by mass of EX-201 (resorcinol diglycidyl ether produced by Nagase ChemteX Corporation, epoxy equivalent weight: 115 g/eq) and 5 parts by mass of 2P4MHZ-PW (2-phenyl-4-methyl-5-hydroxymethylimidazole, produced by Shikoku Chemicals Corporation).

Example 30

With 18.2 parts by mass of the thermosetting resin mixture (X-1) prepared in Preparation example 1, 81.8 parts by mass of the surface-treated spinel (F-1) was mixed. The resulting mixture was kneaded with a planetary centrifugal kneader. The kneaded mixture was degassed using a decompressor at ordinary temperature and a reduced pressure of 0.1 MPa for 5 minutes. Hereby, a thermosetting resin composition that included a thermally conductive filler at a filling ratio of 60 volume % was prepared.

(Method for Measuring Thermal Conductivity of Thermosetting Resin Composition)

The thermally conductive resin composition was hot-pressed into a resin cured article 1 (50×50×about 0.8 mm) (curing conditions: 170° C.×20 minutes). The resin cured article 1 was further cured in a dryer at 170° C.×2 hours and 200° C.×2 hours. A 10 mm×10 mm sample was taken from the cured product, and the thermal conductivity of the sample at 25° C. was measured with a thermal conductivity meter (LFA467 HyperFlash, produced by NETZSCH).

Examples 31 to 43 and Comparative Examples 14 to 20

A thermosetting resin composition was prepared as in Example 30 at the mixing ratio described in Tables 5-1 to 5-5 below, and the thermal conductivity of the resin cured article was measured as in Example 30.

TABLE 11

| | | Example 30 | Example 31 | Example 32 | Example 33 | Example 34 |
|---|---|---|---|---|---|---|
| Surface-treated spinel particles (B) | Type | F-1 | F-2 | F-3 | F-4 | F-5 |
| | Amount (mass part) | 81.8 | 81.8 | 81.8 | 81.8 | 81.8 |
| High-molecular weight organic compound (C) | X-1 | 18.2 | 18.2 | 18.2 | 18.2 | 18.2 |
| Spinel content (vol %) | | 60 | 60 | 60 | 60 | 60 |
| Thermal conductivity (W/mK · 25° C.) | | 2.3 | 2.3 | 2.5 | 2.5 | 2.4 |

TABLE 12

| | | Example 35 | Example 36 | Example 37 | Example 38 | Example 39 |
|---|---|---|---|---|---|---|
| Surface-treated spinel particles (B) | Type | F-6 | F-7 | F-8 | F-15 | F-16 |
| | Amount (mass part) | 81.8 | 81.8 | 81.8 | 81.8 | 81.8 |
| High-molecular weight organic compound (C) | X-1 | 18.2 | 18.2 | 18.2 | 18.2 | 18.2 |
| Spinel content (vol %) | | 60 | 60 | 60 | 60 | 60 |
| Thermal conductivity (W/mK · 25° C.) | | 2.4 | 2.8 | 2.7 | 2.4 | 2.3 |

TABLE 13

| Table 5-3 | | Example 40 | Example 41 | Example 42 | Example 43 |
|---|---|---|---|---|---|
| Surface-treated spinel particles (B) | Type | F-17 | F-18 | F-19 | F-20 |
| | Amount (mass part) | 81.8 | 81.8 | 81.8 | 81.8 |
| High-molecular weight organic compound (C) | X-1 | 18.2 | 18.2 | 18.2 | 18.2 |
| Spinel content (vol %) | | 60 | 60 | 60 | 60 |
| Thermal conductivity (W/mK · 25° C.) | | 2.4 | 2.3 | 2.3 | 2.3 |

TABLE 14

| Table 5-4 | | Comparative example 14 | Comparative example 15 | Comparative example 16 | Comparative example 17 |
|---|---|---|---|---|---|
| Spinel particles | Type | A-1 | A-2 | HA-1 | HF-1 |
| | Amount (mass part) | 81.8 | 81.8 | 81.8 | 81.8 |
| High-molecular weight organic compound (C) | X-1 | 18.2 | 18.2 | 18.2 | 18.2 |

TABLE 14-continued

| Table 5-4 | Comparative example 14 | Comparative example 15 | Comparative example 16 | Comparative example 17 |
|---|---|---|---|---|
| Spinel content (vol %) | 60 | 60 | 60 | 60 |
| Thermal conductivity (W/mK · 25° C.) | 2.1 | 2.1 | 1.9 | 2.0 |

TABLE 15

| Table 5-5 | | Comparative example 18 | Comparative example 19 | Comparative example 20 |
|---|---|---|---|---|
| Spinel particles | Type | HF-2 | HF-3 | HF-4 |
| | Amount (mass part) | 81.8 | 81.8 | 81.8 |
| High-molecular weight organic compound (C) | X-1 | 18.2 | 18.2 | 18.2 |
| Spinel content (vol %) | | 60 | 60 | 60 |
| Thermal conductivity (W/mK · 25° C.) | | 1.9 | 2.0 | 2.0 |

Preparation Example 2

Resin Mixture (X-2)

A resin mixture (X-2) having a solid content of 59% by mass was prepared by mixing 60 parts by mass of 2,2',7,7'-tetraglycidyloxy-1,1'-binaphthalene (epoxy resin, epoxy equivalent weight: 144 g/eq) with 10 parts by mass of EX-201 (resorcinol diglycidyl ether produced by Nagase ChemteX Corporation, epoxy equivalent weight: 115 g/eq) and 100 parts by mass of the phenoxy resin solution described below.

<Phenoxy Resin Solution>

Into a flask equipped with a thermometer, a cooling tube, and a stirrer, 114 g of bisphenol A, 191.6 g (epoxy equivalent weight: 188 g/eq) of a bisphenol-A-type epoxy resin (EP-CLON-850S produced by DIC Corporation), and 130.9 g (nonvolatile content: 70%) of cyclohexanone were charged. The inside of the system was purged with nitrogen. While nitrogen was slowly flown into the flask and the resulting mixture was stirred, the temperature was increased to 80° C. Subsequently, 120 mg (400 ppm relative to the theoretical resin solid content) of 2E4MZ (2-ethyl-4-imidazole, produced by Shikoku Chemicals Corporation) was added to the mixture. Then, the temperature was further increased to 150° C. Subsequently, stirring was performed at 150° C. for 20 hours. MEK and cyclohexanone were added to the stirred mixture such that the nonvolatile content (N.V.) was 30% (MEK:cyclohexanone=1:1). The resulting phenoxy resin solution had a viscosity of 5200 mPa·s. The nonvolatile component of the phenoxy resin solution had an epoxy equivalent weight of 12500 g/eq.

Example 44

With 170 parts by mass of the resin mixture (X-2) prepared in Preparation example 2, 1231 parts by mass of the surface-treated spinel (F-3) and 339 parts by mass of an aluminum oxide powder AA-04 (produced by Sumitomo Chemical Co., Ltd.) having an average particle diameter of 0.4 µm were mixed. The resulting mixture was kneaded with a planetary centrifugal kneader. To the mixture, 2.5 parts by mass of 2P4MHZ-PW (2-phenyl-4-methyl-5-hydroxymethylimidazole, produced by Shikoku Chemicals Corporation), 3.1 parts by mass of AH-154 (dicyandiamide curing agent, produced by Ajinomoto Fine-Techno Co., Inc.), and 130 parts by mass of methyl ethyl ketone (MEK) were added. The resulting mixture was kneaded with a planetary centrifugal kneader. The kneaded mixture was degassed using a decompressor at ordinary temperature and a reduced pressure of 0.1 MPa for 5 minutes. Hereby, a thermosetting resin composition was prepared.

The thermosetting resin composition was applied, with a rod-like metal applicator, onto the surface of a release film prepared by subjecting one of the surfaces of a polyethylene terephthalate film having a thickness of 75 µm to a releasing treatment with a silicone compound, so as to form a coating film having a thickness of 100 µm after being dried.

The coated film was charged in a dryer at 50° C. for 2 minutes and then charged into a dryer at 85° C. for 3 minutes. After the coated film had been dried, a release film prepared by subjecting one of the surfaces of a polyethylene terephthalate film having a thickness of 38 µm to a releasing treatment with a silicone compound was bonded to the coated surface.

The bonded films were passed through the gap between a heating roller heated at 90° C. and a resin roller at a speed of 1.5 m/minute such that a pressure of 0.2 MPa was applied onto the surfaces of the bonded films. Hereby, a thermally conductive adhesive sheet that included a thermally conductive adhesive sheet having a thickness of 100 µm sandwiched between the two types of release films was prepared.

(Method for Measuring Thermal Conductivity of Thermally Conductive Adhesive Sheet)

The thermally conductive adhesive sheet from which the release films had been removed was left to stand in an environment of 200° C. for 90 minutes in order to cause thermosetting. The resulting cured product was cut into a square piece with 10 mm sides to prepare a test sample. The thermal conductivity of the test sample at 25° C. was measured with a thermal conductivity meter (LFA467nanoflash, produced by NETZSCH).

(Density Ratio of Thermally Conductive Adhesive Sheet)

The density of the specimen taken from the cured product was measured by the Archimedes method. The measured density was divided by the theoretical density calculated from the composition ratio to obtain the density ratio.

(Method for Measuring Adhesive Strength)

The thermally conductive adhesive sheet from which the release films had been removed was placed on an end (25 mm×12.5 mm) of aluminum strips (25 mm×100 mm×1.6 mm). The aluminum strip was bonded to another metal strip having the same shape as the aluminum strip. Subsequently, curing was performed at 170° C.×2 hours and subsequently at 200° C.×1.5 hours. Hereby, a multilayer body was prepared.

The measurement was conducted using an adhesive strength tester "STROGRAPH APII (produced by Toyo Seiki Seisaku-sho, Ltd.)" in accordance with the method for testing tensile lap-shear strength (JISK6850). A tensile force was applied to the multilayer body in a direction parallel to the bond surface, and the maximum load at which the multilayer body became ruptured was divided by the area of the bond (i.e., shear) surface to obtain the adhesive strength.

Examples 45 to 50 and Comparative Examples 21 and 22

A thermosetting resin composition and a thermally conductive adhesive sheet were prepared as in Example 44 using the specific raw materials described in Tables 6-1 to 6-3. The measurement of thermal conductivity and adhesive strength was conducted as in Example 44.

Example 51

With 170 parts by mass of the resin mixture (X-2) prepared in Preparation example 2, 923 parts by mass of the surface-treated spinel (F-7), 308 parts by mass of the surface-treated spinel (F-12), and 339 parts by mass of an aluminum oxide powder AA-04 (produced by Sumitomo Chemical Co., Ltd.) having an average particle diameter of 0.4 μm were mixed. The resulting mixture was kneaded with a planetary centrifugal kneader. To the mixture, 2.5 parts by mass of 2P4MHZ-PW (2-phenyl-4-methyl-5-hydroxymethylimidazole, produced by Shikoku Chemicals Corporation), 3.1 parts by mass of AH-154 (dicyandiamide curing agent, produced by Ajinomoto Fine-Techno Co., Inc.), and 130 parts by mass of methyl ethyl ketone (MEK) were added. The resulting mixture was kneaded with a planetary centrifugal kneader. The kneaded mixture was degassed using a decompressor at ordinary temperature and a reduced pressure of 0.1 MPa for 5 minutes. Hereby, a thermosetting resin composition was prepared.

The thermosetting resin composition was applied, with a rod-like metal applicator, onto the surface of a release film prepared by subjecting one of the surfaces of a polyethylene terephthalate film having a thickness of 75 μm to a releasing treatment with a silicone compound, so as to form a coating film having a thickness of 100 μm after being dried.

The coated film was charged in a dryer at 50° C. for 2 minutes and then charged into a dryer at 85° C. for 3 minutes. After the coated film had been dried, a release film prepared by subjecting one of the surfaces of a polyethylene terephthalate film having a thickness of 38 μm to a releasing treatment with a silicone compound was bonded to the coated surface.

The bonded films were passed through the gap between a heating roller heated at 90° C. and a resin roller at a speed of 1.5 m/minute such that a pressure of 0.2 MPa was applied onto the surfaces of the bonded films. Hereby, a thermally conductive adhesive sheet that included a thermally conductive adhesive sheet having a thickness of 100 μm sandwiched between the two types of release films was prepared.

Examples 52 and 53 and Comparative Example 23

A thermosetting resin composition and a thermally conductive adhesive sheet were prepared as in Example 51 using the specific raw materials described in Tables 6-2 and 6-3. The measurement of thermal conductivity and adhesive strength was conducted as in Example 51.

TABLE 16

| | | Example 44 | Example 45 | Example 46 | Example 47 | Example 48 |
|---|---|---|---|---|---|---|
| Large filler | Type | F-3 | F-4 | F-9 | F-10 | F-7 |
| | Amount (mass part) | 1231 | 1231 | 1231 | 1231 | 1231 |
| Medium filler | Type | | | | | |
| | Amount (mass part) | | | | | |
| Small filler | Type | AA-04 | AA-04 | AA-04 | AA-04 | AA-04 |
| | Amount (mass part) | 339 | 339 | 339 | 339 | 339 |
| High-molecular weight organic compound (C) | X-2 | 170 | 170 | 170 | 170 | 170 |
| 2P4MHZ-PW | | 2.5 | 2.5 | 2.5 | 2.5 | 2.5 |
| AH-154 | | 3.1 | 3.1 | 3.1 | 3.1 | 3.1 |
| Methyl ethyl ketone | | 130 | 130 | 130 | 130 | 130 |
| Density ratio (%) | | 98 | 98 | 98 | 98 | 97 |
| Thermal conductivity (W/mK · 25° C.) | | 13.5 | 13.2 | 13.0 | 12.5 | 12.7 |
| Adhesive strength (Mpa) | | 6.5 | 6.7 | 6.3 | 6.0 | 6.5 |

TABLE 17

| | | Example 49 | Example 50 | Example 51 | Example 52 | Example 53 |
|---|---|---|---|---|---|---|
| Large filler | Type | F-8 | F-11 | F-7 | F-8 | F-11 |
| | Amount (mass part) | 1231 | 1231 | 923 | 923 | 923 |
| Medium filler | Type | | | F-12 | F-13 | F-14 |
| | Amount (mass part) | | | 308 | 308 | 308 |
| Small filler | Type | AA-04 | AA-04 | AA-04 | AA-04 | AA-04 |
| | Amount (mass part) | 339 | 339 | 339 | 339 | 339 |
| High-molecular weight organic compound (C) | X-2 | 170 | 170 | 170 | 170 | 170 |
| 2P4MHZ-PW | | 2.5 | 2.5 | 2.5 | 2.5 | 2.5 |
| AH-154 | | 3.1 | 3.1 | 3.1 | 3.1 | 3.1 |
| Methyl ethyl ketone | | 130 | 130 | 130 | 130 | 130 |
| Density ratio (%) | | 98 | 98 | 99 | 99 | 99 |
| Thermal conductivity (W/mK · 25° C.) | | 12.3 | 12.2 | 13.6 | 13.3 | 13.0 |
| Adhesive strength (Mpa) | | 6.1 | 6.3 | 6.5 | 6.2 | 6.8 |

TABLE 18

| Table 6-3 | | Comparative example 20 | Comparative example 21 | Comparative example 22 |
|---|---|---|---|---|
| Large filler | Type | HA-1 | HF-3 | HF-3 |
| | Amount (mass part) | 1231 | 1231 | 923 |
| Medium filler | Type | | | HF-5 |
| | Amount (mass part) | | | 308 |
| Small filler | Type | AA-04 | AA-04 | AA-04 |
| | Amount (mass part) | 339 | 339 | 339 |
| High-molecular weight organic compound (C) | X-2 | 170 | 170 | 170 |

TABLE 18-continued

| Table 6-3 | Comparative example 20 | Comparative example 21 | Comparative example 22 |
|---|---|---|---|
| 2P4MHZ-PW | 2.5 | 2.5 | 2.5 |
| AH-154 | 3.1 | 3.1 | 3.1 |
| Methyl ethyl ketone | 130 | 130 | 130 |
| Density ratio (%) | 94 | 95 | 95 |
| Thermal conductivity (W/mK · 25° C.) | 7.1 | 7.3 | 7.3 |
| Adhesive strength (Mpa) | 2.5 | 3.0 | 2.7 |

INDUSTRIAL APPLICABILITY

The surface-treated spinel particles (B) according to the present invention have excellent dispersibility and excellent dispersion stability in the high-molecular weight organic compound (C) and are capable of producing further excellent properties. Consequently, a molded article that includes the surface-treated spinel particles (B) and the high-molecular weight organic compound (C) has further excellent thermal conductivity. The resin composition according to the present invention which includes the surface-treated spinel particles (B) and the high-molecular weight organic compound (C) can be suitably used for producing a circuit, a substrate, an adhesive used for bonding of modules, an adhesive sheet, or a resin molded article. A molded article produced by molding the resin composition according to the present invention has a high heat dissipation capacity and can be suitably used for producing electronic components, such as electrical and electric equipment and OA instrument, and automotive components.

The invention claimed is:

1. A surface-treated spinel particle (B) comprising a spinel particle (A) including a magnesium atom, an aluminum atom, and an oxygen atom and a surface treatment layer disposed at least a portion of the surface of the spinel particle (A), the surface treatment layer including a surface-treating agent including an organic compound or a cured product of the surface-treating agent, the spinel particle (A) further including molybdenum, the molybdenum content of the spinal particle (A) is 0.15 to 5% by mass, the crystallite diameter of the [111] plane of the spinel particle (A) being 220 nm or more, the crystallite diameter of the [311] plane of the spinel particle (A) being 100 nm or more and wherein the ratio ([111] plane/[311] plane) of the crystal peak intensity of the [111] plane of the spinel particle (A) to the crystal peak intensity of the [311] plane of the spinel particle (A) is 0.3 or more.

2. The surface-treated spinel particle (B) according to claim 1, wherein the spinel particle (A) has an average diameter of 0.1 to 1000 μm.

3. The surface-treated spinel particle (B) according to claim 2, wherein the organic compound is at least one organic compound selected from the group consisting of an organosilane compound, an organotitanium compound, and an organic phosphate compound.

4. The surface-treated spinel particle (B) according to claim 1, wherein the organic compound is at least one organic compound selected from the group consisting of an organosilane compound, an organotitanium compound, and an organic phosphate compound.

5. A resin composition comprising the surface-treated spinel particle (B) according to claim 1 and a high-molecular weight organic compound (C).

6. A resin composition comprising the surface-treated spinel particle (B) according to claim 2 and a high-molecular weight organic compound (C).

7. A resin composition comprising the surface-treated spinel particle (B) according to claim 4 and a high-molecular weight organic compound (C).

8. A molded article produced by molding the resin composition according to claim 5.

9. A method for producing a surface-treated spinel particle (B), the method comprising bringing a spinel particle (A) including a magnesium atom, an aluminum atom, and an oxygen atom, the crystallite diameter of the [111] plane of the spinel particle (A) being 220 nm or more, into contact with a surface-treating agent including at least one organic compound selected from the group consisting of an organosilane compound, an organotitanium compound, and an organic phosphate compound, in order to deposit the surface-treating agent onto at least a portion of the surface of the spinel particle (A) the spinel particle (A) further including molybdenum, the molybdenum content of the spinal particle (A) is 0.15 to 5% by mass.

10. The method for producing a surface-treated spinel particle (B) according to claim 9, wherein the step of bringing the spinel particle (A) into contact with the surface-treating agent is conducted by a wet process.

* * * * *